(12) United States Patent
Chakraborty

(10) Patent No.: US 11,070,525 B2
(45) Date of Patent: Jul. 20, 2021

(54) METHOD AND SYSTEM OF PRIVACY ENABLEMENT IN A FAMILY NETWORKING COMPUTING PLATFORM

(71) Applicant: Adris Chakraborty, New Yor, NY (US)

(72) Inventor: Adris Chakraborty, New Yor, NY (US)

(*) Notice: Subject to any disclaimer, the term of this patent is extended or adjusted under 35 U.S.C. 154(b) by 0 days.

(21) Appl. No.: 16/714,767

(22) Filed: Dec. 15, 2019

(65) Prior Publication Data

US 2020/0389438 A1    Dec. 10, 2020

Related U.S. Application Data

(63) Continuation-in-part of application No. 16/206,479, filed on Nov. 30, 2018, now Pat. No. 10,880,250, which is a continuation-in-part of application No. 15/342,362, filed on Nov. 3, 2016, now Pat. No. 10,110,689.

(60) Provisional application No. 62/322,794, filed on Apr. 15, 2016.

(51) Int. Cl.
| | |
|---|---|
| *G06F 15/16* | (2006.01) |
| *H04L 29/06* | (2006.01) |
| *H04L 12/58* | (2006.01) |
| *H04L 29/08* | (2006.01) |
| *G06Q 20/12* | (2012.01) |
| *G06Q 50/00* | (2012.01) |
| *G06Q 50/26* | (2012.01) |
| *G06F 21/62* | (2013.01) |

(52) U.S. Cl.
CPC ...... *H04L 63/0414* (2013.01); *G06F 21/6263* (2013.01); *G06Q 20/1235* (2013.01); *G06Q 50/01* (2013.01); *G06Q 50/265* (2013.01); *H04L 51/32* (2013.01); *H04L 67/306* (2013.01)

(58) Field of Classification Search
CPC ............... G06F 21/6263; G06Q 20/1235; G06Q 50/01; G06Q 50/265; H04L 51/32; H04L 63/0414; H04L 67/306
USPC .............. 709/204, 205, 206, 223, 224
See application file for complete search history.

(56) References Cited

U.S. PATENT DOCUMENTS

| | | | | |
|---|---|---|---|---|
| 8,442,758 B1* | 5/2013 | Rovik | ............ | G01C 21/343 701/424 |
| 9,020,965 B1* | 4/2015 | Sehrer | ............ | G06Q 50/01 707/758 |
| 2009/0217178 A1* | 8/2009 | Niyogi | ............ | G06Q 30/0269 715/753 |

(Continued)

*Primary Examiner* — Liang Che A Wang

(57) ABSTRACT

In one aspect, computerized method of a managing an online social network comprising: providing an online social network, wherein the online social network comprises a set of nodes, wherein each node represents a user and a set of relationships between each node; managing a private profile setting in the online social network by: in the settings of a user's dashboard of the online social networking-computing, providing the user an option to change to a private user from a public user; detecting that the user has selected to be a private user; and assigning a unique networking-computing platform identifier to the private user, wherein the unique networking-computing platform identifier is required to search for the private user in the online social network, wherein the private user cannot make any comment to another user's post, and wherein the private user is enabled to like the user's post.

17 Claims, 40 Drawing Sheets

(56) References Cited

U.S. PATENT DOCUMENTS

| | | | |
|---|---|---|---|
| 2012/0268269 A1* | 10/2012 | Doyle | G08B 21/0272 340/539.13 |
| 2013/0007788 A1* | 1/2013 | Levinson | G08B 25/005 725/13 |
| 2017/0118207 A1* | 4/2017 | Madhu | G06K 9/00288 |
| 2017/0213272 A1* | 7/2017 | Mowatt | G06Q 30/0204 |

* cited by examiner

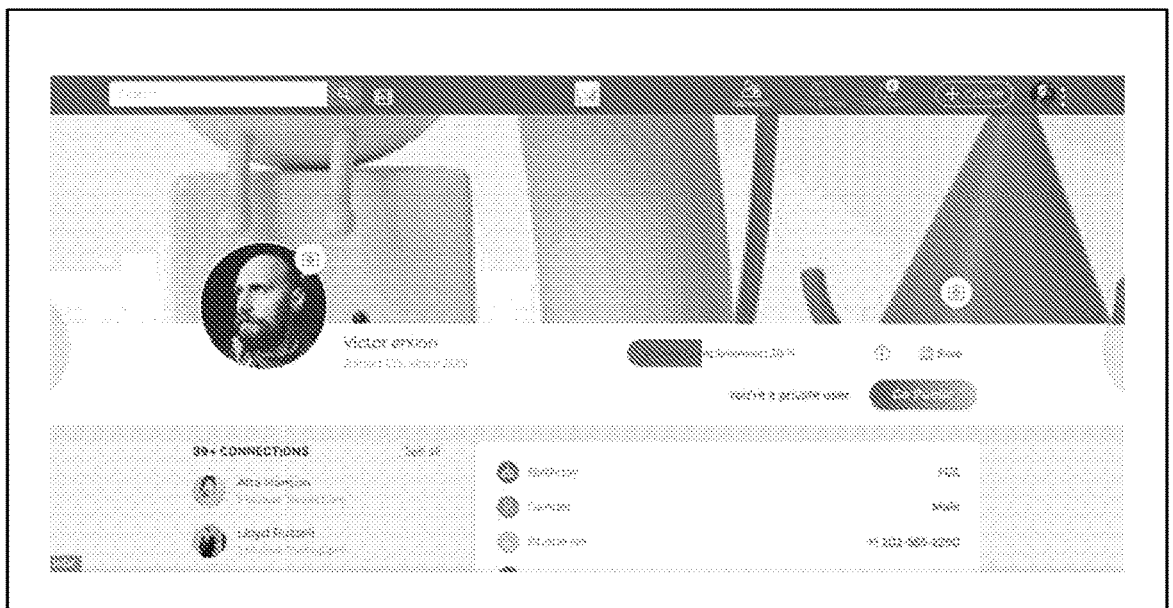
FIGURE 29     2900
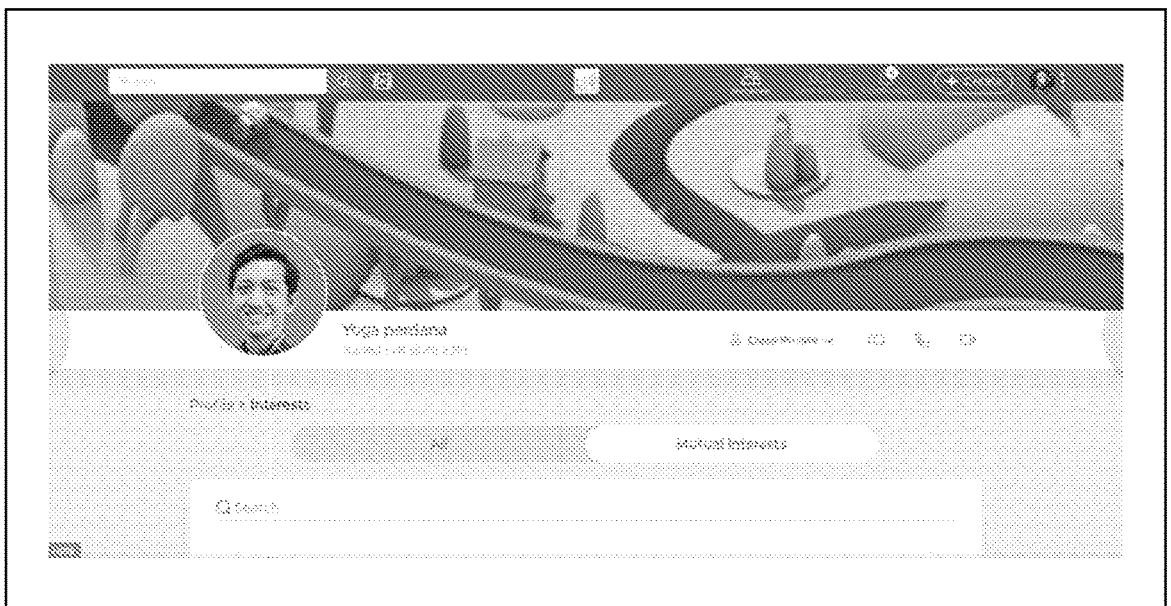
FIGURE 30     3000

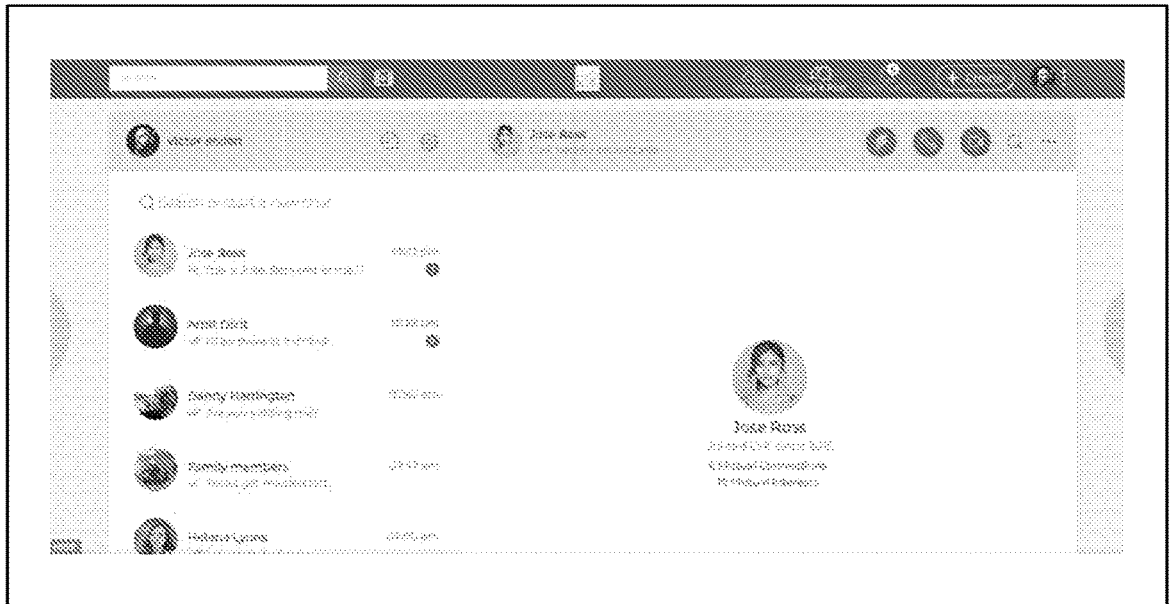
FIGURE 31     3100
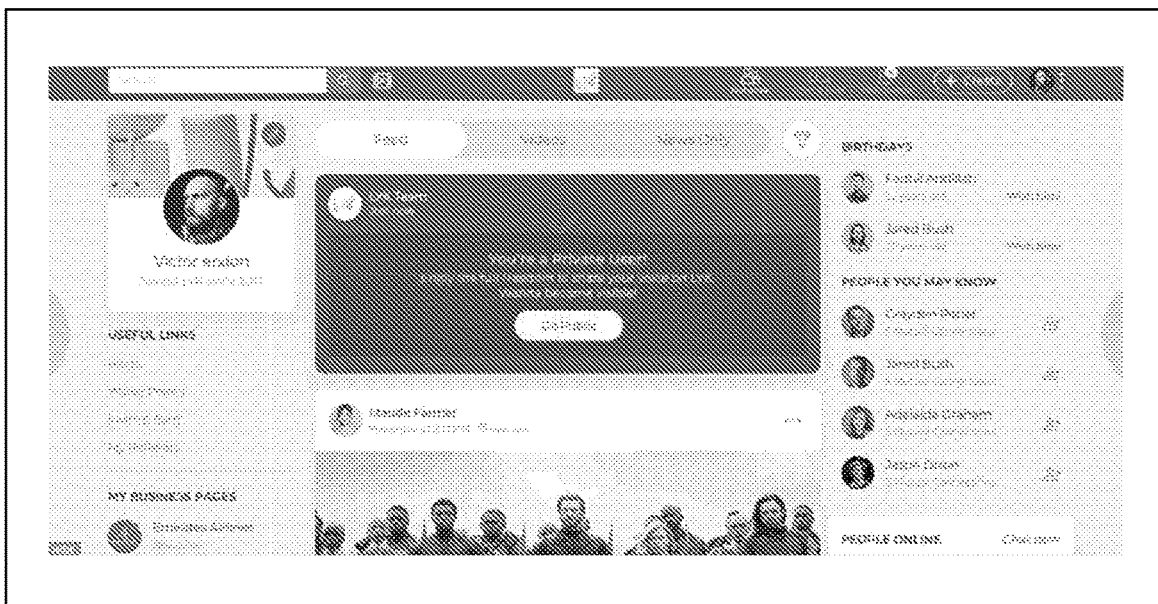
FIGURE 32     3200

METHOD AND SYSTEM OF PRIVACY
ENABLEMENT IN A FAMILY NETWORKING
COMPUTING PLATFORM

CROSS-REFERENCE TO RELATED
APPLICATIONS

This application is a continuation in part of U.S. patent application Ser. No. 16/206,479, filed on Nov. 30, 2018. This application is hereby incorporated by reference in its entirety. U.S. patent application Ser. No. 16/206,479 is a continuation in part of and claims priority to U.S. patent application Ser. No. 15/342,362, filed on 3 Nov. 2016. This application is hereby incorporated by reference in its entirety. U.S. patent application Ser. No. 15/342,362, filed on 3 Nov. 2016 claims priority to U.S. Provisional Patent Application No. 62/322,794, filed on 15 Apr. 2016.

FIELD OF THE INVENTION

The invention is in the field of online social networks and more specifically to a method, system and apparatus of privacy enablement in a family networking computing platform.

DESCRIPTION OF THE RELATED ART

Online social networks can be a social networking service implemented by a computing platform. Online social networks can be accessible via user's various computing devices (e.g. via a web browser in a mobile device, etc.). Online social networks can be analyzed using Social network analysis (SNA). SNA can be used to identify the types relationships between users of the online social network. Specific types of relationships can lead to various insights into the nature of the online social network. In this way, the online social network can be updated based on changes to user relationships. Various types of users can be aggregated together as well. Families form a basic unit of human social living. Family members can use online social networking services to interact with each other. Accordingly, improvements to managing online social networking services for family members are desired.

BRIEF SUMMARY OF THE INVENTION

In one aspect, computerized method of a managing an online social network comprising: providing an online social network, wherein the online social network comprises a set of nodes, wherein each node represents a user and a set of relationships between each node; managing a private profile setting in the online social network by: in the settings of a user's dashboard of the online social networking-computing, providing the user an option to change to a private user from a public user; detecting that the user has selected to be a private user; and assigning a unique networking-computing platform identifier to the private user, wherein the unique networking-computing platform identifier is required to search for the private user in the online social network, wherein the private user cannot make any comment to another user's post, and wherein the private user is enabled to like the user's post.

BRIEF DESCRIPTION OF THE DRAWINGS

The present application can be best understood by reference to the following description taken in conjunction with the accompanying figures, in which like parts may be referred to by like numerals.

FIGS. 27-39 illustrate example screenshots that can be used to implement managing private profiles, according to some embodiments.

DETAILED DESCRIPTION

Figure 1:
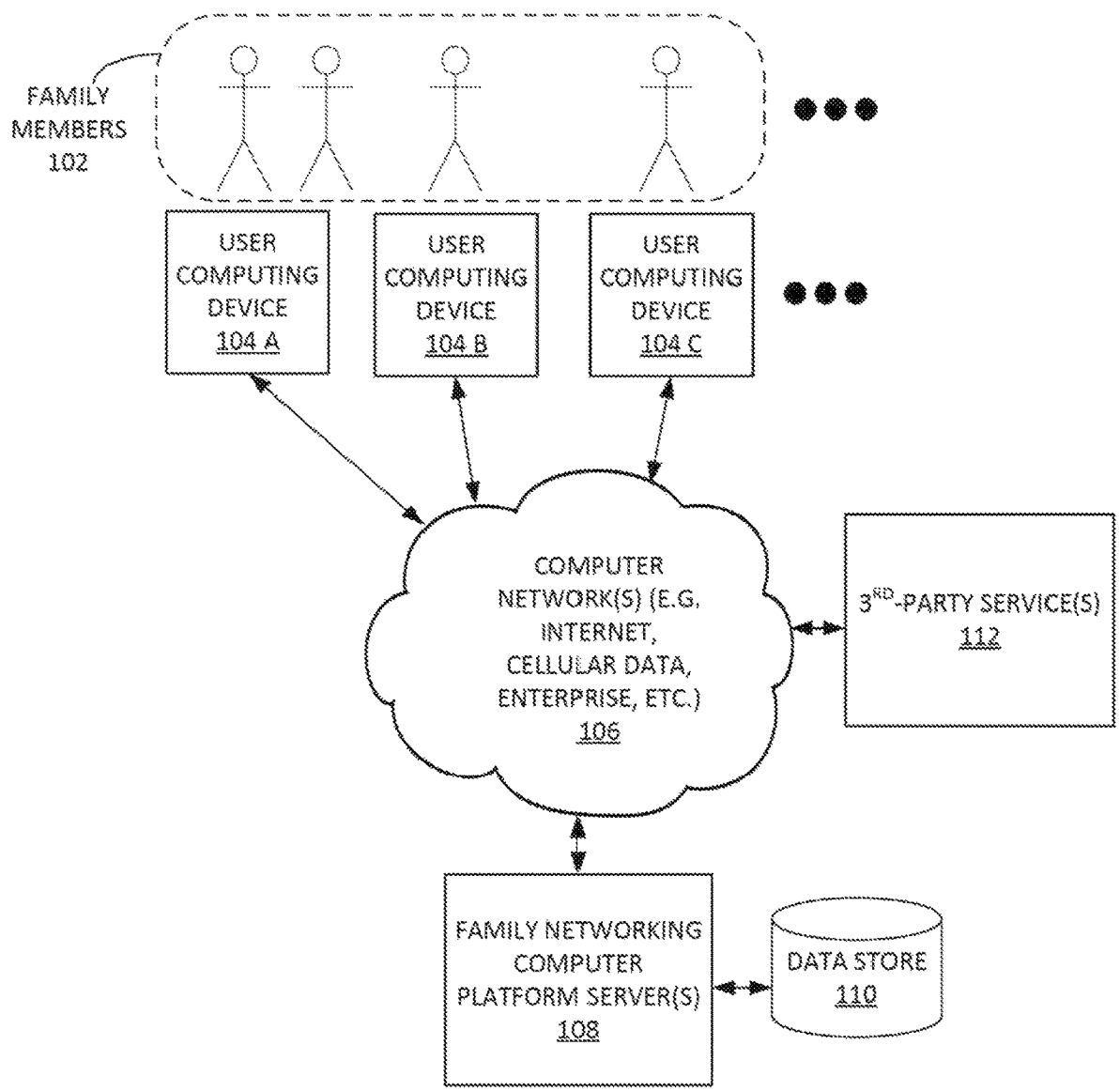
FIG. 1 illustrates an example system for implementing family networking-computing platform, according to some embodiments.

Disclosed are a system, method, and article of manufacture of privacy enablement in a family networking computing platform. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The Figures described above are a representative set, and are not an exhaustive with respect to embodying the invention.

Definitions

The following are example definitions that can be utilized to implement some embodiments.

Backtesting can refer to testing a predictive model using existing historic data. Backtesting is a kind of retrodiction, and a special type of cross-validation applied to time series data.

Behavioral analytics is a subset of business analytics that focuses on how and why a user of a specified application behaves.

Bootstrap aggregating ('bagging') can be a machine learning ensemble meta-algorithm designed to improve the stability and accuracy of machine learning algorithms used in statistical classification and regression.

Chatbot can be a computer program which conducts a conversation via auditory and/or textual methods.

Cluster analysis or clustering is the task of grouping a set of objects in such a way that objects in the same group (called a cluster) are more similar (in some sense or another) to each other than to those in other groups (clusters).

Computing platform can be a framework on which applications may be run. It can include various hardware architecture, operating systems (OS), and/or runtime libraries Data aggregator can be an organization involved in compiling information from detailed databases on individuals and providing that information to others.

Database management system (DBMS) can be a computer program (or more typically, a suite of them) designed to manage a database, a large set of structured data, and run operations on the data requested by numerous users, processes, etc.

Digital wallet can be an electronic device or online service that allows an individual to make electronic transactions. This can include purchasing items on-line with a computer or using a smartphone to purchase something at a store. A digital wallet can use cryptocurrencies. Cryptocurrency is a digital asset designed to work as a medium of exchange that uses strong cryptography to secure financial transactions, control the creation of additional units, and verify the transfer of assets.

Ensemble learning can use multiple learning algorithms to obtain better predictive performance than could be obtained from any of the constituent learning algorithms.

Instant messaging (IM) can be a type of online chat that offers real-time text transmission over the Internet. Short messages are typically transmitted bi-directionally between two parties, when each user chooses to complete a thought and select 'send'.

Logistic regression can include, inter alia, measuring the relationship between the categorical dependent variable and one or more independent variables, which are usually (but not necessarily) continuous, by using probability scores as the predicted values of the dependent variable.

Machine learning can include various methods of enabling computer processes to make and improve predictions or behaviors based on test data. Machine learning can include the construction and study of systems that can learn from data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Mobile device can include a handheld computing device that includes an operating system (OS), and can run various types of application software, known as apps. Example handheld devices can also be equipped with various context sensors (e.g. biosensors, physical environmental sensors, etc.), digital cameras, Wi-Fi, Bluetooth, and/or GPS capabilities. Mobile devices can allow connections to the Internet and/or other Bluetooth-capable devices, such as an automobile, a wearable computing system and/or a microphone headset. Exemplary mobile devices can include smart phones, tablet computers, optical head-mounted display (OHMD), virtual reality head-mounted display, smart watches, other wearable computing systems, etc.

Mean squared error (MSE) of an estimator can measure the average of the squares of the "errors", that is, the difference between the estimator and what is estimated.

Online chat can utilize communication over the Internet that offers a real-time transmission of text messages from sender to receiver. In some embodiments, online chat can include any direct text-based or video-based (e.g. with webcams), one-on-one chat or one-to-many group chat (formally also known as synchronous conferencing), using tools such as instant messengers, Internet Relay Chat (IRC), etc.

Online wallet is a software or web service that allows users to store and control their online shopping information, such as logins, passwords, shipping address and credit card details. It also provides a method for consumers to purchase products from online retailers.

Random forest can be an ensemble learning method for classification, regression and other tasks, that operate by constructing a multitude of decision trees at training time and outputting the class that is the mode of the classes (e.g. classification) or mean prediction (e.g. regression) of the individual trees. Random forests can correct for decision trees' habit of overfitting to their training set. As an ensemble method, random Forest can combine one or more 'weak' machine-learning methods together. Random forest can be used in supervised learning (e.g. classification and regression), as well as unsupervised learning (e.g. clustering).

Recommendation system can be a type of information filtering system that predicts the rating and/or preference that a user would give to an item (e.g. a family activity, vacation destination, gift, etc.).

Social networking service can be an online platform that is used by people to build social networks or social relations with other people who share similar personal or career interests, activities, backgrounds or real-life connections.

Test data set can be a set of data used in various areas of information science to assess the strength and utility of a predictive relationship.

Training set can be a set of data used in various areas of information science to discover potentially predictive relationships. Training sets can be used in artificial intelligence, machine learning, genetic programming, intelligent systems, and statistics.

Exemplary Systems

FIG. 1 illustrates an example system 100 for implementing family networking-computing platform, according to some embodiments. System 100 can include a plurality of family members 102. In one example, a family can include a group of people affiliated by consanguinity (e.g. by recognized birth), affinity (e.g. by marriage), co-residence, legal definitions, etc. Family members 102 can utilize one or more user-computing devices 104 to access computer network(s) (e.g. the Internet, etc.). In some embodiments, user-computing devices 104 can include client-side applications for implementing user-side functionalities related to a family networking-computing platform. The family networking-computing platform can be implemented on one or more family networking-computing platform server(s) 108. It is noted, that in some examples, a user can have more than one mobile device and/or use more than one type of mobile device (e.g. a mobile phone and a wearable smart watch).

Figure 2:
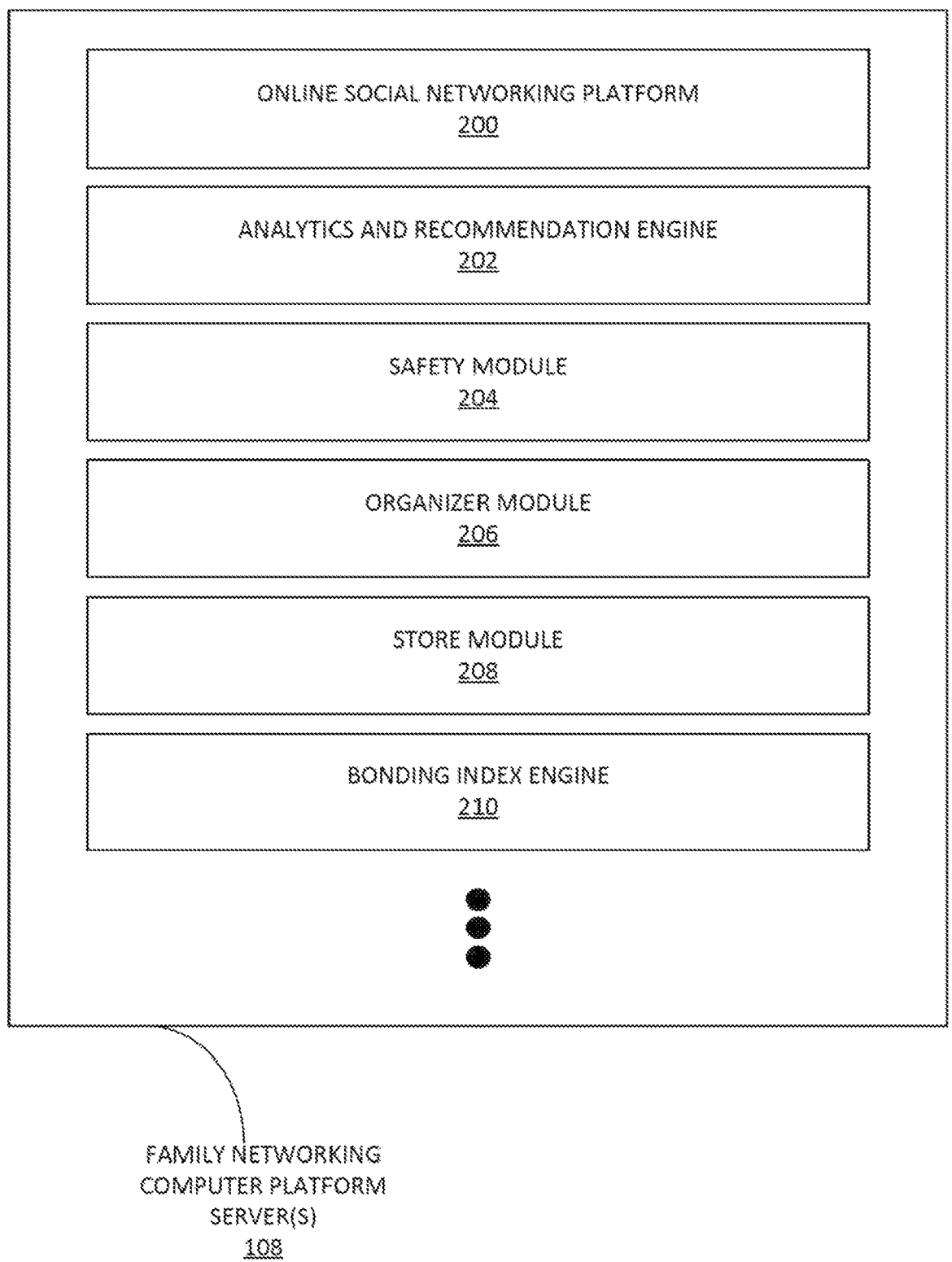
FIG. 2 illustrates an example family networking-computing platform server(s), according to some embodiments.

Example functionalities of family networking-computing platform server(s) 108 are provided infra in FIG. 2. In some embodiments, family networking-computing platform server(s) 108 can implement a social networking platform for families. Family networking-computing platform server(s) 108 can obtain family member profiles and/or preferences. These can be obtained from explicit user-provided information.

These can also be constructed from implicit profiles created by analyzing family member behavior (e.g. 'likes', sharing actions, media accessed, news items accessed, other online social networking behavior, etc.). Family networking-computing platform server(s) 108 can make various recommendations (e.g. family activities, inviting members, suggested gifts, etc.) for families. For examples, parses big data about users using machine-learning algorithms. Explicit family member profile information can include, inter alia: birthdays, demographic data, online social networking profiles, hobbies, favorites books, favorite movies, favorite music, favorite sports teams, education, career information, pet information, aspirational activities, etc.

For example, family networking-computing platform server(s) 108 can collects data from user's social profiles, in-application behavior, mobile phone information (e.g. GPS data, time stamps, etc.). Based on this information, family networking-computing platform server(s) 108 can generate a user profile of interests (e.g. a set of topics that each family member cares about in terms of possible activities, gifts, vacation destinations, etc.). Family networking-computing platform server(s) 108 can then utilize various online social networking services to communicate this information to family members at appropriate times (e.g. via in-application push notifications, text messages, emails, and the like). Family networking-computing platform server(s) 108 can share this information with other members. Information can be abstracted such that the sharing of family member preferences is comfortable for all family members. Family networking-computing platform server(s) 108 can suggest common family interests for vacation, can suggest gifts of a husband for his wife, etc. It is noted that a family can have an extended form as well. Like two users are member of a family if there is any family-related connection (e.g. through another family relation) between them.

Family networking-computing platform server(s) 108 can provide a website to host the online social network for families. Family networking-computing platform server(s) 108 can provide a homepage. The homepage can provide user updates through a personalized feed (e.g. based on a user's explicit or implicit likes, etc.). Family networking-computing platform server(s) 108 can use machine-learning to refine a user's feed based on news the user is reading and not reading as this behavior can further imply user interests. Also, this information can be used to make newsfeed more accurate to user's interests. Data used by family networking-computing platform server(s) 108 can be stored in data store 110. Family networking-computing platform server(s) 108 can also obtain data from third-party services server(s) 112 (e.g. GPS data, mapping services, other social networking API's, analytics services, newsfeed sources, vacation/travel services, e-commerce companies, etc.). This information can be posted to the online social network.

FIG. 2 illustrates an example family networking-computing platform server(s) 108, according to some embodiments. Family networking-computing platform server(s) 108 can include online social-networking platform 200. Online social-networking platform 200 can implement the online social-networking functionalities (e.g. newsfeeds, image sharing, messaging, status updates, etc.). The social networking service can include a platform to build social networks or social relations among people who share similar interests, activities, backgrounds or real-life connections.

Family networking-computing platform server(s) 108 can include analytics and recommendation engine 202. Analytics and recommendation engine 202 can analyze user behavior (e.g. social networking graphs, user recommendations/likes/shares, microblog posts, status updates, profiles, media accessed, contacts, web browser history, e-commerce related behavior, etc.). Analytics and recommendation engine 202 can include a recommendation system for making family-related recommendations (e.g. vacations, gifts, activities, etc.) based on said user behavior. Analytics and recommendation engine 202 can implement machine-learning algorithms. For example, analytics and recommendation engine 202 can learn from previous user behavior. This can be used to increase the accuracies of later interactions with the user. For example, analytics and recommendation engine 202 can use machine learning to learn from user behavior vis-à-vis past recommendation and modify the attributes of later recommendation results based on the user's subsequent behavior patterns. Analytics and recommendation engine 202 can rank recommendations based on various factors (e.g. past user behavior, user demographics, user incomes, user profiles, behaviors of other family member connections, etc.). It is noted that recommendations can be based on users' past behaviors but also on their availability that can be found from the organizer module 206.

Safety module 204 can be used to implement a geographic-zone safety feature in the family-network computing platform. For example, a user (e.g. a parent, etc.) can define one or more unsafe zones for family and self. For example, the user can drop points on a map to define an unsafe zone. In one example, the user can drop three (3) or more pins that then can define the unsafe zone in its borders (e.g. using a mapping service). This area/region in points is defined as unsafe. Safety module 204 can then track family member's mobile devices. When a family member enters an unsafe zone, he can receive an update that he has entered the unsafe zone (e.g. via a text message, in application message, etc.). Safety module 204 can also provide an 'SOS' virtual button. When the 'SOS' virtual button is pressed, safety module 204 can send a message to a curated list of safe people (e.g. parents, uncle, grandparent, older siblings, civil authorities, teachers, law enforcement, etc.). In some embodiments, Safety module 204 can implement various geo-fencing (e.g. uses global positioning (GPS) or radio frequency identification (RFID) to define a geographic boundary. Then, once this "virtual barrier" is established, an administrator can set up triggers that send a text message, email alert, or app notification when a mobile device enters (or exits) the specified area) techniques and methods. Process 300, infra, illustrates an example process that can be implemented by safety module 204. In one example, the system can notify local police (or such authorities) when the SOS button is pressed. The hone number of the local police can be picked up based on the geo location of the user. It is noted that shared unsafe locations and other data are re-shareable.

Organizer module 206 can manage various organizing applications. For example, organizer module 206 can include a calendar application that can be populated with important family dates. (e.g. birthdays, kid's games, practice times, etc.). Organizer module 206 can include a task-manager application. This can be used to add tasks/events to calendar for a user and family members. Organizer module 206 can send messages/reminders to relevant family members. Organizer module 206 can implement/manage both a time-management web application and mobile application in a user's mobile device.

Store module 208 can manage various e-commerce functionalities of the family networking-computing platform. As used herein, e-commerce can include the trading and/or facilitation of trading in products or services using computer networks, such as the Internet. In one example, store module 208 can manage an online retail store that is curated for items that can be gifted to family members, family member health care services, etc. Store module 208 can manage electronic payments as well.

Bonding index engine 210 can calculate a family-bonding index. In some embodiments, a family-bonding index can a quantitative measure of a family's relationships (e.g. family closeness, etc.). Bonding index engine 210 can provide graphical view of family closeness. This can be used to show how the family networking-computing platform has increased family bonding. The family-bonding index can be based on various factors. For example, if it is detected that a family attends a movie together, then the family-bonding index increases. Process 400, infra, provides an example of a process for calculating a family-bonding index. The bonding index can be available for every connected pair of user (e.g. for every recorded relation, etc.).

In some embodiments, family networking-computing platform server(s) 108 can be implemented in a cloud-computing platform. It is noted that family networking-computing platform server(s) 108 can include additionally systems, not shown, such as, inter alia: database managers, search engines, natural-language processing systems, search engines, web servers, geo-fencing systems, mobile-device tracking systems, chat services, API's, electronic payment systems, etc.

In some embodiments, system 200 can enable a user can post status update visible only to family members. User can check how you are connected to another person in the world. Users can see their links (when it exists) with other users through chain of family members. Users get relevant suggestions to add other users as family members or as "close". Users can mark a region as unsafe and share that with other users (in their connection). The other users can re-share the same with their connections. The system counts the number of users who accepts the unsafe location. Based on the number of acceptance, a measure of severity is attached to that unsafe location. System 200 can enable organizers/calendar functionalities. User creates an event, and share with his/her connections. The recipient users can accept, and re-share the event further. The system identifies common free time within family members and recommend useful events for the entire family. Users can post digital items like pictures and texts for other users in their connections (e.g. their family members or any other user in connection list. Posts can be re-shared by the recipients. All the objects created by user (e.g. unsafe regions, event posts, etc.) can also be cross posted in other social media platforms. To add a phone number to the list of emergency phone numbers, users need to request the owner of a phone number. If the owner of the phone number is already a member, then the owner gets a notification. And on approval, the number gets added to user's list of emergency numbers. In case the owner of the number is not a member, then the owner receives a message on the mobile number to download and authorize the user to use the phone number as an emergency phone number. Based on the location, local emergency phone numbers (police, ambulance) gets added to the list of emergency phone number.

Exemplary Methods

Figure 3:
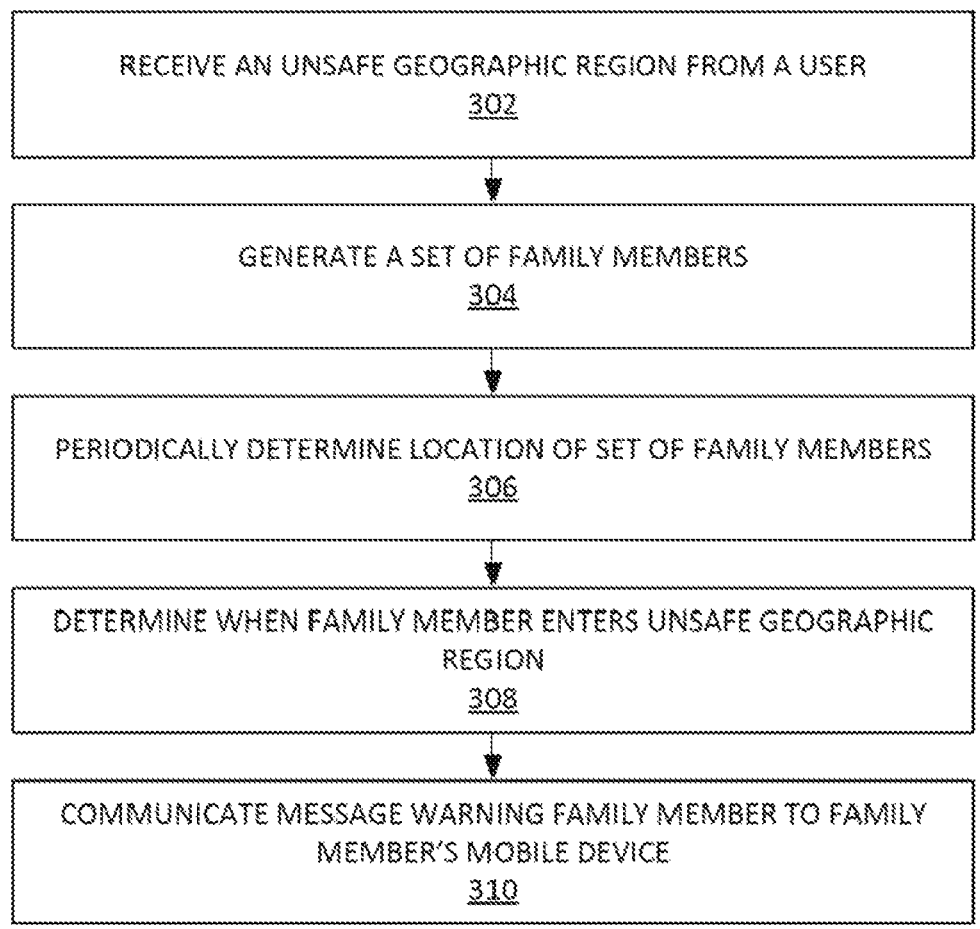
FIG. 3 illustrates an example process for implementing an unsafe geographic area for a family in a family networking-computing platform, according to some embodiments.

FIG. 3 illustrates an example process 300 for implementing an unsafe geographic area for a family in a family networking-computing platform, according to some embodiments. Process 300 can receive an unsafe geographic region from a user in step 302. Process 300 can generate a set of family members in step 304. Process 300 can periodically determine location of set of family members in step 306. Process 300 can determine when family member enters unsafe geographic region in step 308. Process 300 can communicate message warning family member to family member's mobile device in step 310.

Figure 4:
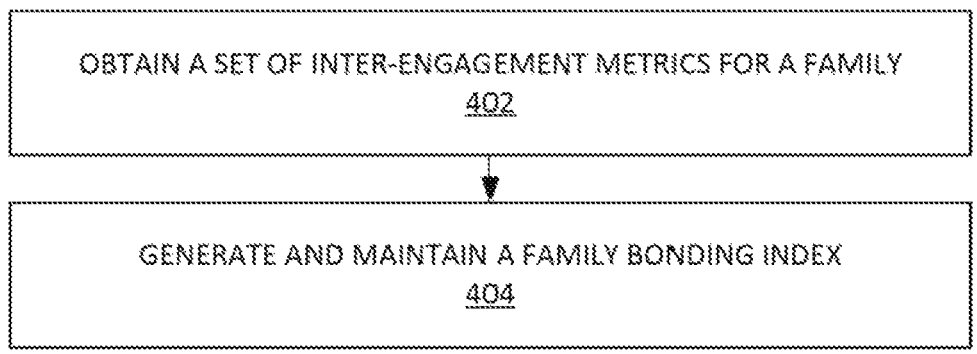
FIG. 4 illustrates an example process for implementing a family-bonding index, according to some embodiments.

FIG. 4 illustrates an example process 400 for implementing a family-bonding index, according to some embodiments. In step 402, process 400 can obtain a set of inter-engagement metrics for a family. In step 404, process 400 can generate and maintain a family bonding index. In some examples, process 400 can generate a bonding index for a family. Process 400 can also generate a bonding index between any pair of user within a family. In other words, a bonding index can be computed between any relation that is being set by the users.

It is noted, that users can connect with other users with a relation. For example, if user1 connects user2 as a father and user1 connects user3 as mother, then the system can recommend user2 and user3 to add each other as spouse.

Exemplary Environment and Architecture

Figure 5:
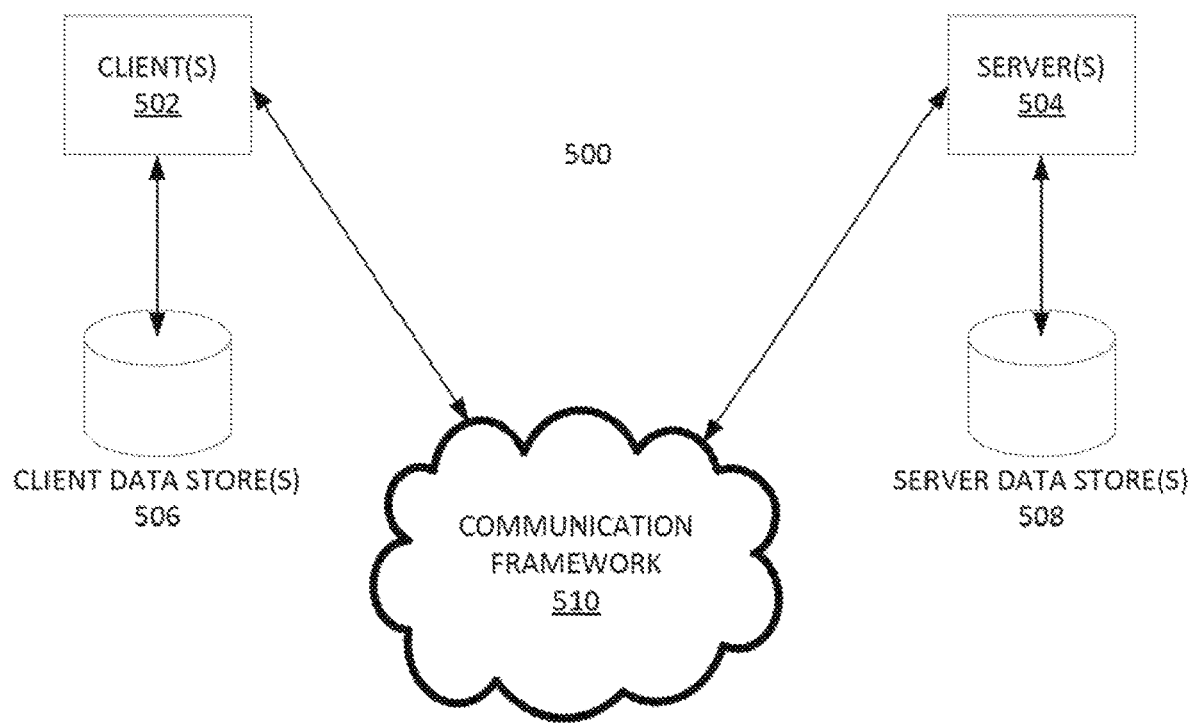
FIG. 5 is a block diagram of a sample-computing environment that can be utilized to implement some embodiments.

FIG. 5 is a block diagram of a sample-computing environment 500 that can be utilized to implement some embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504.

In some embodiments, system 500 can be include and/or be utilized by the various systems and/or methods described herein to implement processes 300, 400 as well as other processes. Processes 300 and/or 400 can be stored in databases 506 and/or 508.

Figure 6:
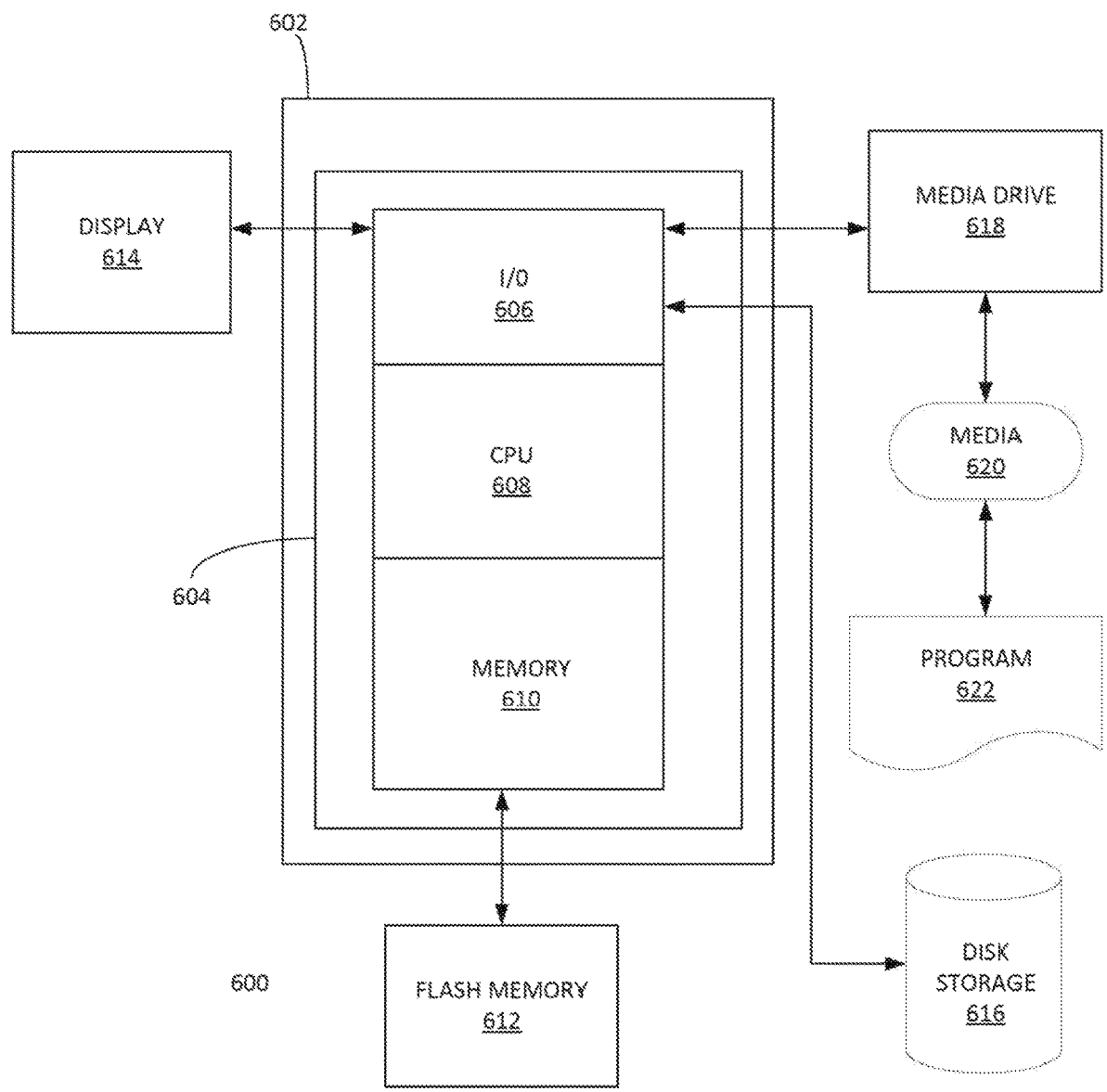
FIG. 6 depicts an exemplary computing system that can be configured to perform any one of the processes provided herein.

FIG. 6 depicts an exemplary computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. In another example, computing system 600 can be configured as a mobile device and include such systems as may be typically included in a mobile device such as GPS systems, gyroscope, accelerometers, cameras, augmented-reality systems, etc.

In one example, the systems of FIG. 6 can be utilized to implement processes the systems and processes of FIGS. 1-4 and Appendix A of U.S. Provisional Patent Application No. 62/322,794, filed on 15 Apr. 2016 and incorporated herein by reference. It is noted that databases described herein can be automatically sampled by the statistical algorithm. There are several methods which may be used to select a proper sample size and/or use a given sample to make statements (within a range of accuracy determined by the sample size) about a specified population. These methods may include, for example:

1. Classical Statistics as, for example, in "Probability and Statistics for Engineers and Scientists" by R. E. Walpole and R. H. Myers, Prentice-Hall 1993; Chapter 8 and Chapter 9, where estimates of the mean and variance of the population are derived.

2. Bayesian Analysis as, for example, in "Bayesian Data Analysis" by A Gelman, 1. B. Carlin, H. S. Stern and D. B. Rubin, Chapman and Hall 1995; Chapter 7, where several sampling designs are discussed.

3. Artificial Intelligence techniques, or other such techniques as Expert Systems or Neural Networks as, for example, in "Expert Systems: Principles and Programming" by Giarratano and G. Riley, PWS Publishing 1994; Chapter 4, or "Practical Neural Networks Recipes in C++" by T. Masters, Academic Press 1993; Chapters 15, 16, 19 and 20, where population models are developed from acquired data samples.

4. Latent Dirichlet Allocation, Journal of Machine Learning Research 3 (2003) 993-1022, by David M. Blei, Computer Science Division, University of California, Berkeley, Calif. 94720, USA, Andrew Y. Ng, Computer Science Department, Stanford University, Stanford, Calif. 94305, USA It is noted that these statistical and probabilistic methodologies are for exemplary purposes and other statistical methodologies can be utilized and/or combined in various embodiments. These statistical methodologies can be utilized in whole or in part as well.

It is noted online social networks can be analyzed using Social network analysis (SNA). SNA is the process of investigating social structures through the use of network and graph theories. It characterizes networked structures in terms of nodes (individual actors, people, or things within the network) and the ties, edges, or links (relationships or interactions) that connect them. Examples of social structures commonly visualized through social network analysis include social media networks, friendship and acquaintance networks, collaboration graphs, kinship, disease transmission, and sexual relationships. These networks are often visualized through sociograms in which nodes are represented as points and ties are represented as lines.

Figure 7:
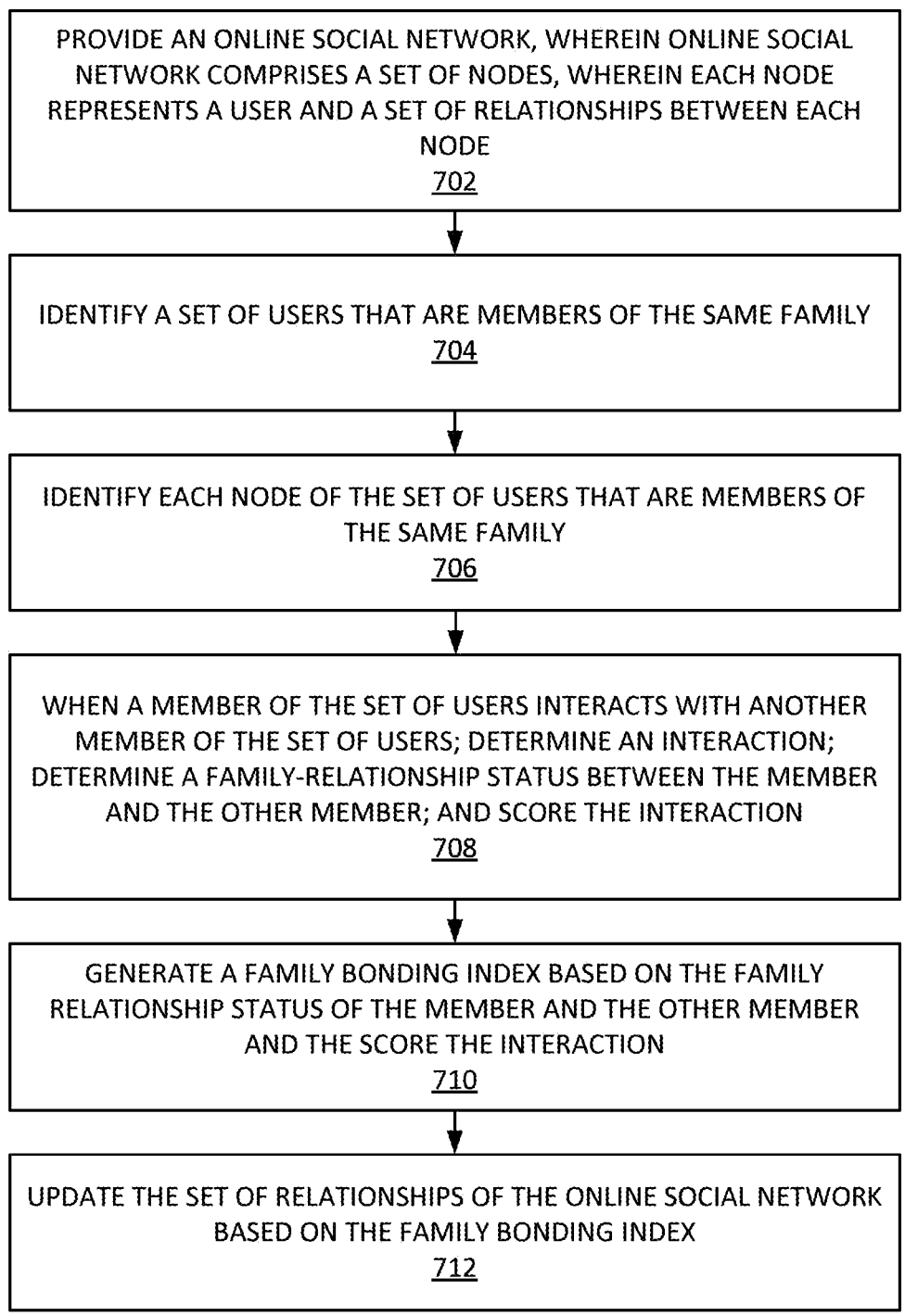
FIG. 7 illustrates an example process for managing an online social network, according to some embodiments.

FIG. 7 illustrates an example process for managing an online social network, according to some embodiments. In step 702, process 700 can provide an online social network. The online social network comprises a set of nodes. Each node represents a user and a set of relationships between each node. In step 704, process 700 can identify a set of users that are members of the same family. In step 706, process 700 can identify each node of the set of users that are members of the same family. In step 708, when a member of the set of users interacts with another member of the set of users, process 700 can determine an interaction; determine a family-relationship status between the member and the other member; and score the interaction. In step 710, process 700 can generate a family bonding index based on the family relationship status of the member and the other member and the score the interaction. In step 712, process 700 can update the set of relationships of the online social network based on the family bonding index.

Methods and Systems of Private Messaging in a Family Networking Computing Platform Various family networking-computing platform embodiments can provide family networking messaging service. Family networking messaging service can include an instant messaging service and an instant-messaging service software application which provides text (e.g. via short messages, etc.) and voice communication.

Instant-messaging service application can be integrated with a family networking-computing web-based Chat feature (e.g. can be built on an open publish-subscribe-based lightweight messaging protocol for use on top of the TCP/IP protocol such as an MQ Telemetry Transport (MQTT) protocol, etc.).

Family networking messaging service can enable family networking service users to chat with friends both on via a mobile-device application and/or on a main family networking messaging service website. Family networking messaging service can support chatbots.

Family networking messaging service can enable users to use a variety of privacy chat options. Family networking messaging service can enable private replies. For example, while in a group chat and/or in a post, a user can privately reply to another participant in that group discussion. The private reply can be shown only to the two users included in the private reply. The private reply can remain hidden from any other participant of the group chat or visitors of the post. A reply provided to a private message can remain private.

A user can use an invisibility message (e.g. chat message, post, etc.) feature as well. The invisibility message feature can enable the user can have a close relation (e.g. a definition of a relationship among eight (8) defined relationships, including: Mother, Father, Spouse, Daughter, Son, Sister, Brother and Close) invisible in their network. For example, when another user reviews the users' public profile on the social network, the other users are not able to see any enumerated invisible connections of the user. Only the user can see his/her close relation connections It is noted that the following communication states can be implemented by the Family networking messaging service based on a user's selection. If a user selects as the recipient only one user, then it is a private chat is implemented. If more than one user is selected then a group chat is implemented. If an entire online social networking community is selected, then a post is implemented.

Family networking messaging service can provide spinoff chats from a group chat (e.g. an online chat, etc.). Spinoff chats can include private replies. If the private reply continues to a certain extent, and/or if any one of the participants in the private thread of the group chat wishes, then the two participants of the private chat spin off from the group chat as one-to-one chat.

Family networking messaging service can provide private comments in between public posts and/or group chat messages.

A user can set a lifetime that private comments, private comments, and/or any other communications are available for others to access. For example, when a user is sending a message, the user can add a life time of five (5) minutes. Accordingly, after five (5) minutes of receiving the message, the message can vanish from the recipient's screen. It is noted that the new spin off chat window can have a reference link to the main chat. User can press the reference link to get back to the parent group chat.

The counting of life time can begin from the time the message is sent, or form the time the message is received. This is an option can be provided to the users sending the message.

Family networking messaging service can provide invisible connections. A user can identify some connections with other users to be invisible. In this way, said connection (e.g. friends, following, likes, shares, etc.) do not appear in the user's list of connections. In one example, the user cannot bring any of my invisible connections to a group chat. Family networking messaging service can provide a mix of private messaging and public content, including brand networks, publications, and live events such as sports and music.

Figure 8:
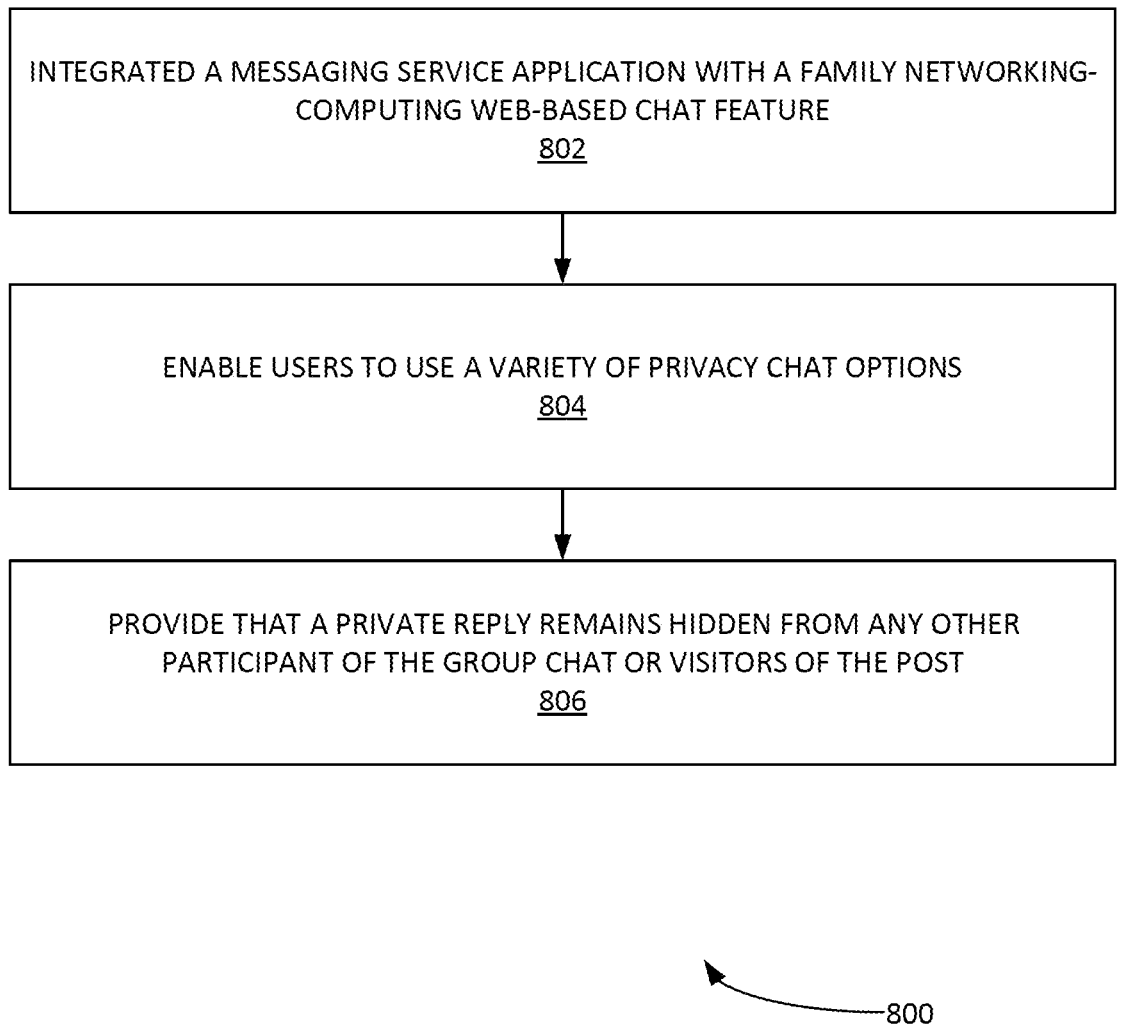
FIG. 8 illustrates an example process of managing private messages, according to some embodiments.

FIG. 8 illustrates an example process 800 of managing private messages, according to some embodiments. In step 802, process 800 can integrate a messaging service application with a family networking computing web-based chat feature. In step 804, process 800 can enable users to use a variety of privacy chat options. In step 806, process 800 can provide that a private reply remains hidden from any other participant of the group chat or visitors of the post.

Figure 9:
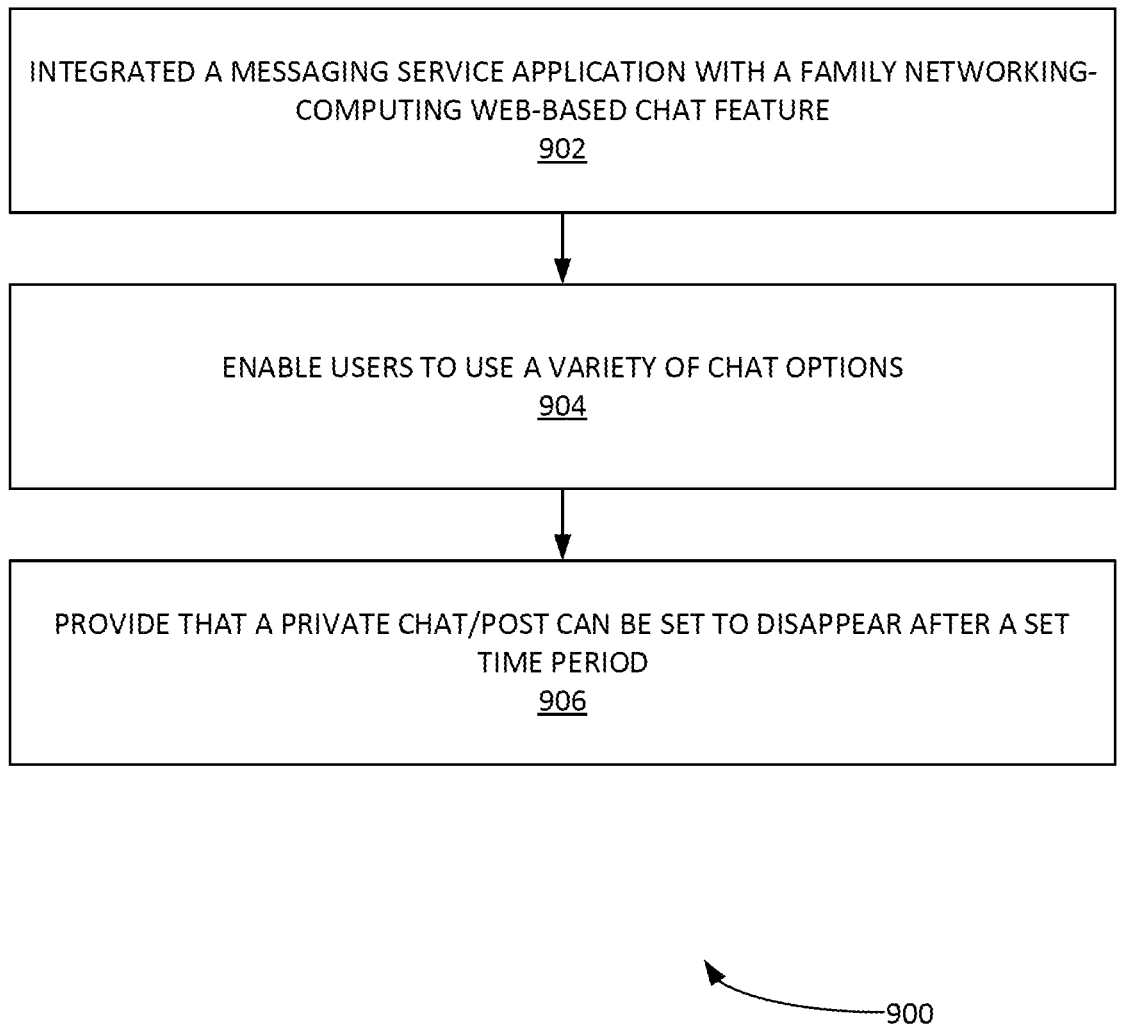
FIG. 9 illustrates an example process of managing private messages, according to some embodiments.

FIG. 9 illustrates an example process 900 of managing private messages, according to some embodiments. In step 902, process 900 can integrate a messaging service application with a family networking-computing web-based chat feature. In step 904, process 900 can enable users to use a variety of chat options. In step 906, process 900 can provide that a private chat/post can be set to disappear after a set time period.

Figure 10:
FIG. 10 illustrates an example screenshot of a chat/post landing page of a Family networking messaging service.
Figure 11A:
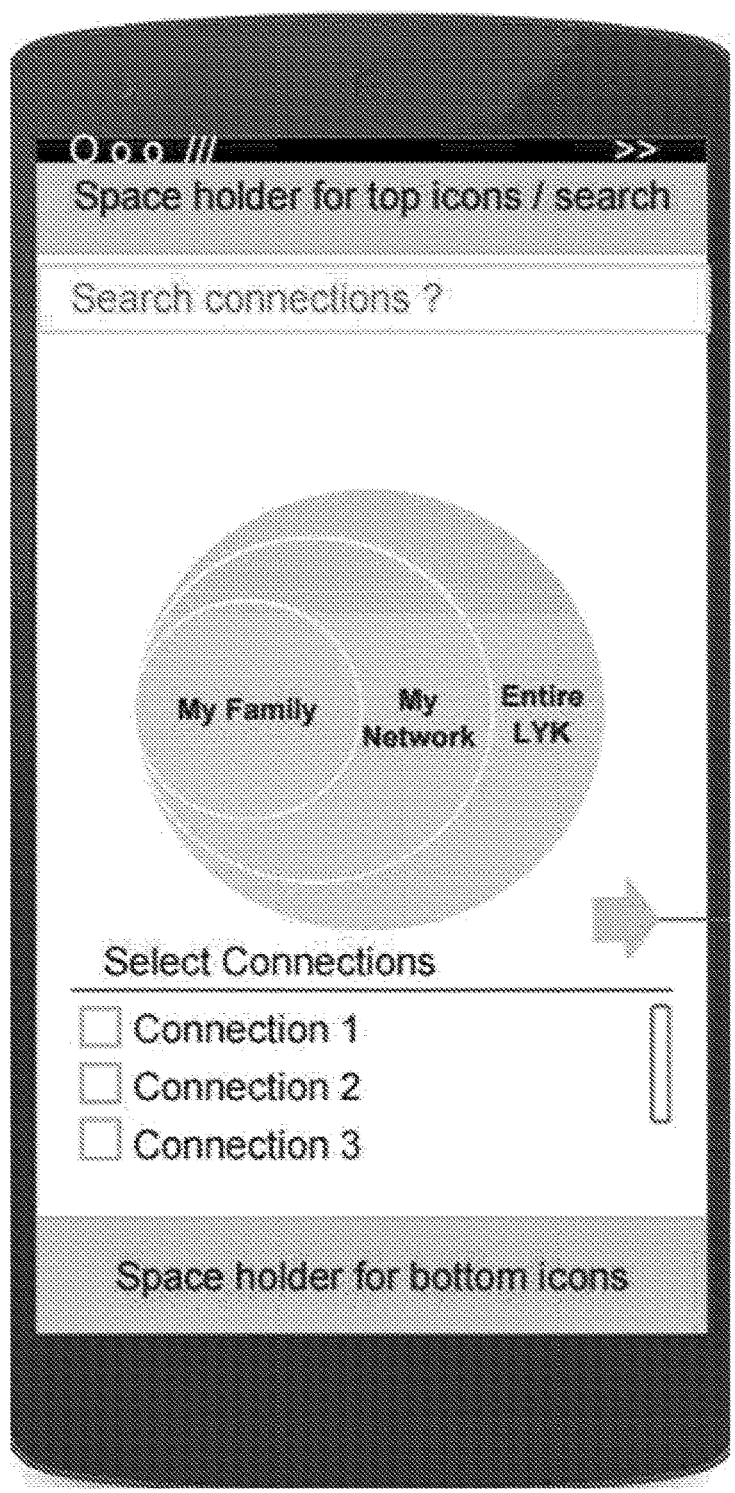
FIGS. 11 A-C illustrate an example screenshot for initiating chats/posting in a Family networking messaging service.
Figure 11B:
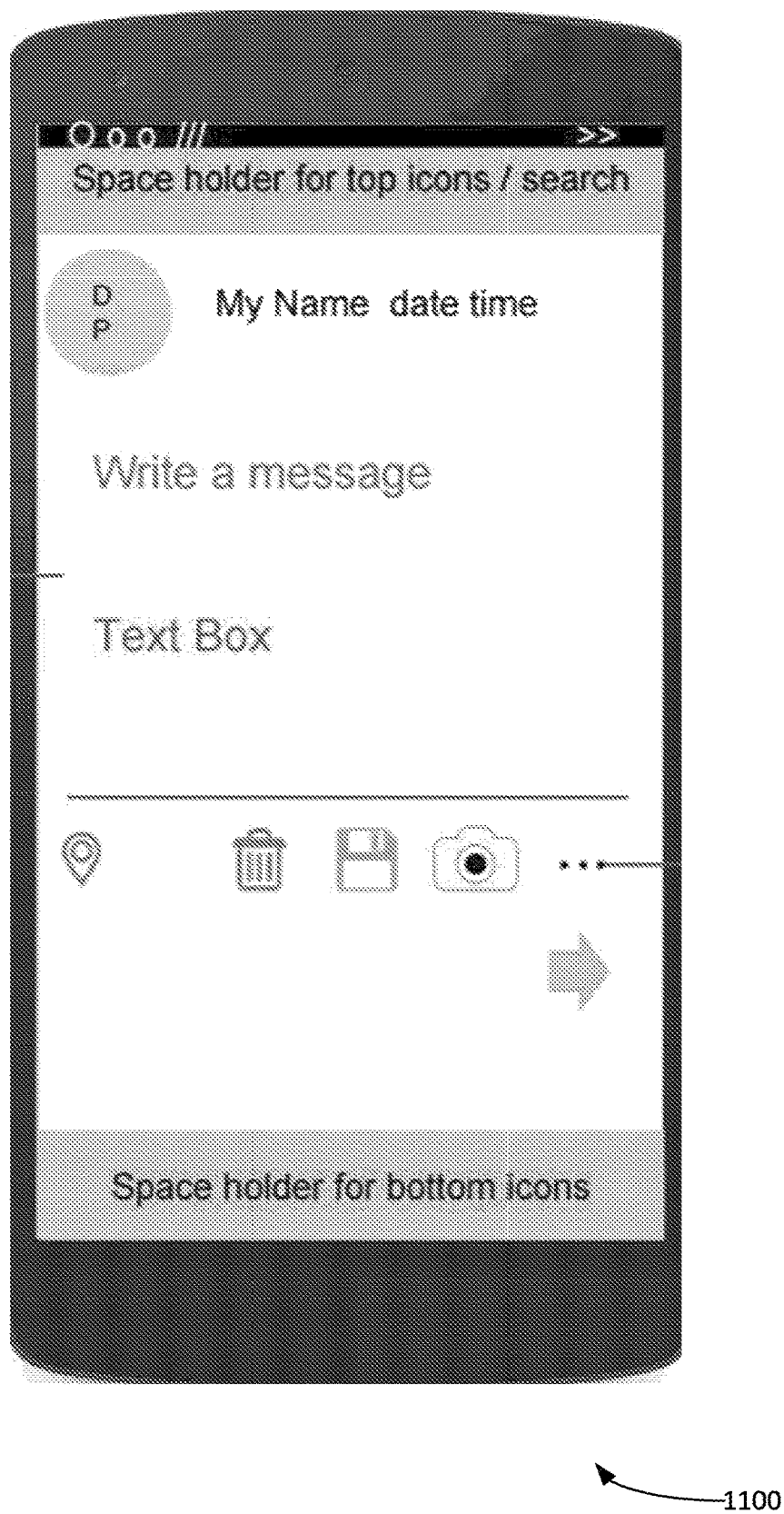
Figure 11C:
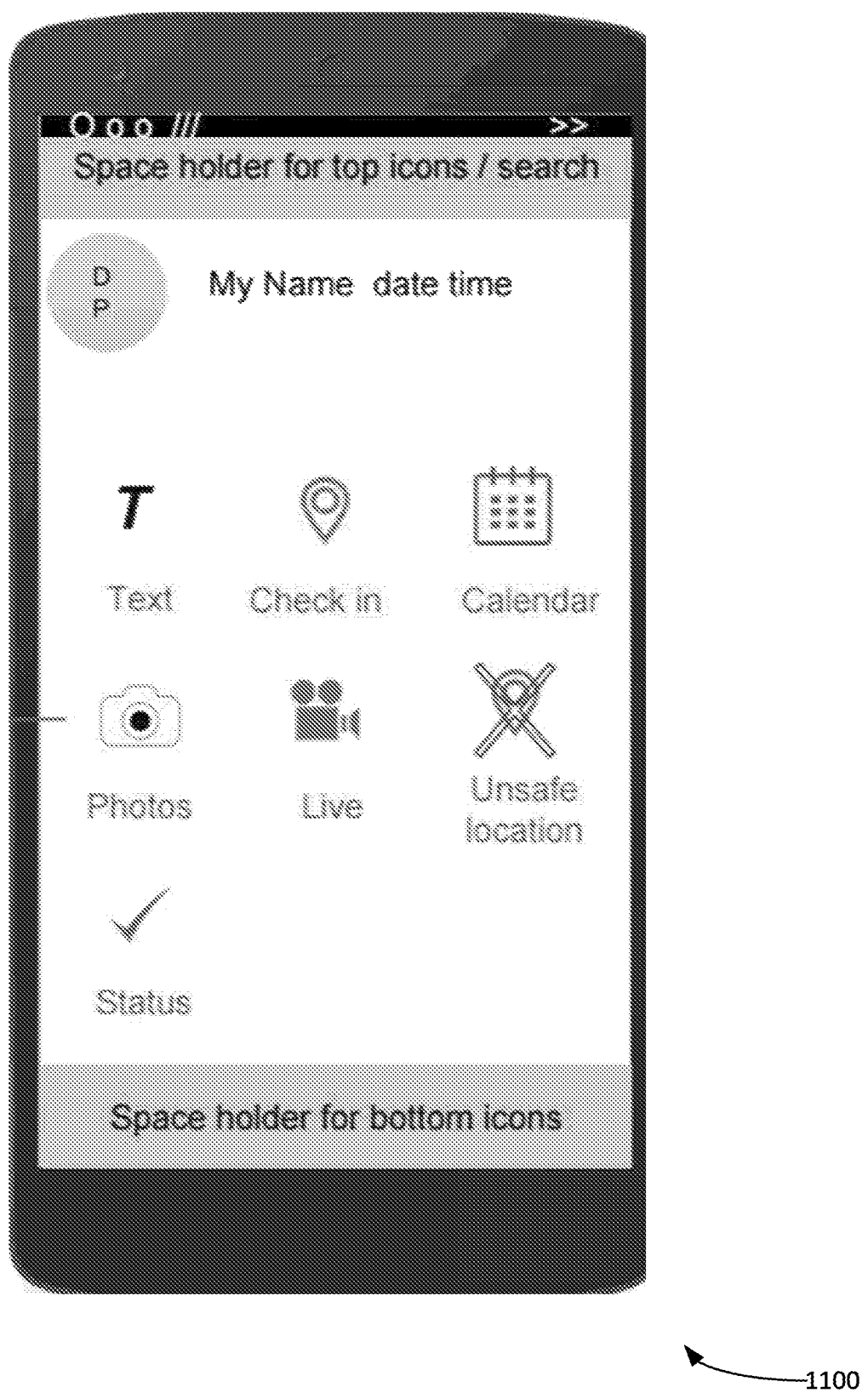
Figure 12:
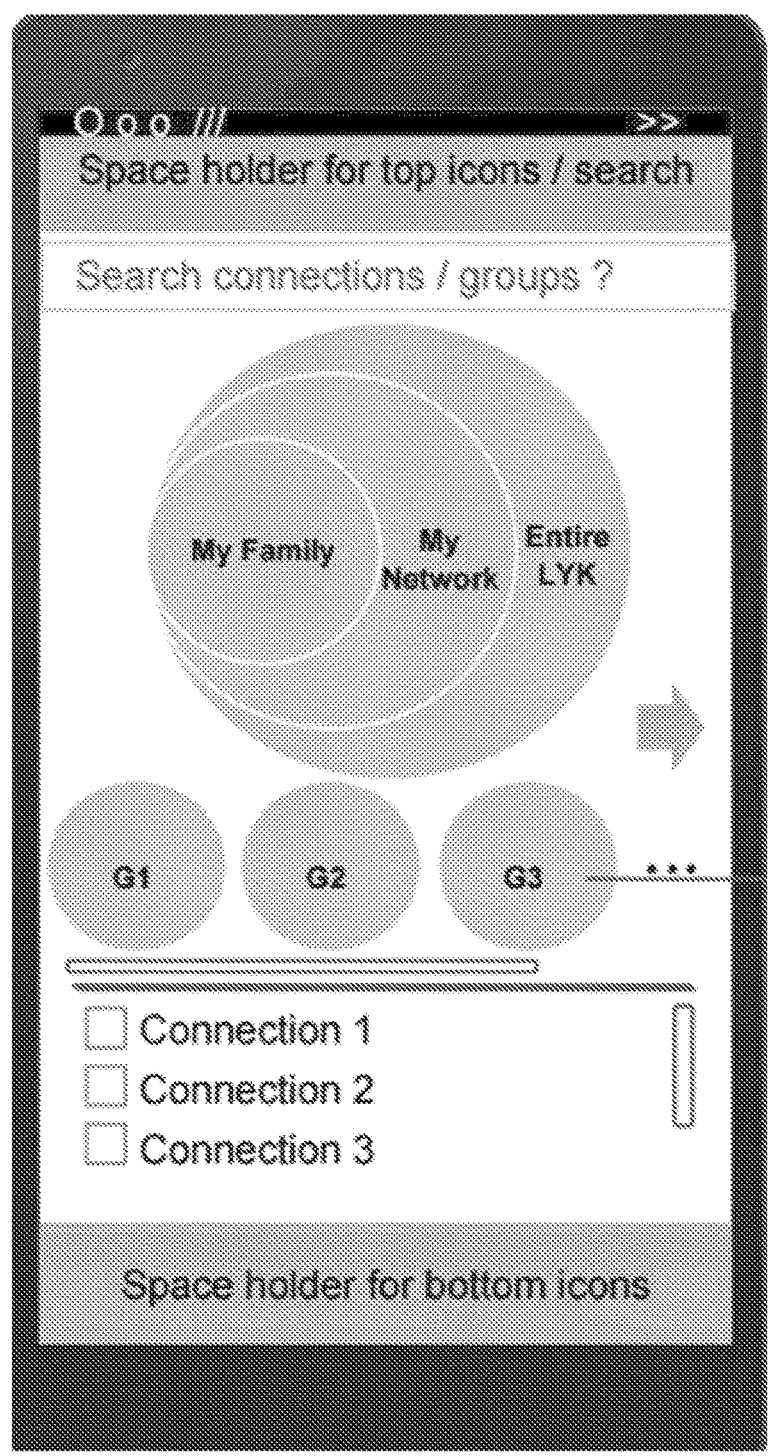
FIG. 12 illustrates an example screenshot of group chat/post pages of a Family networking messaging service.
Figure 13A:
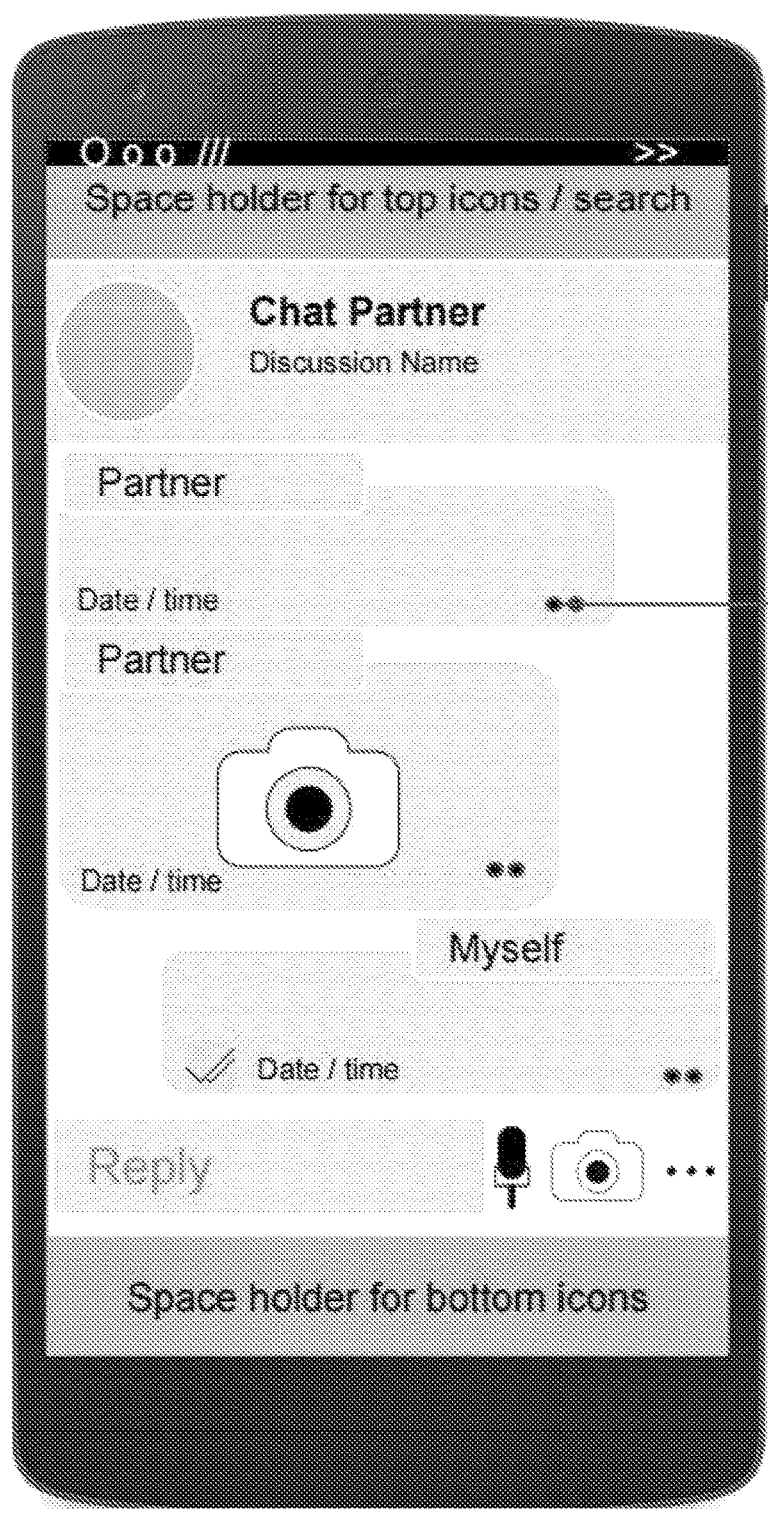
FIGS. 13 A-B illustrate an example screenshot inside an active chat session of a Family networking messaging service.
Figure 13B:
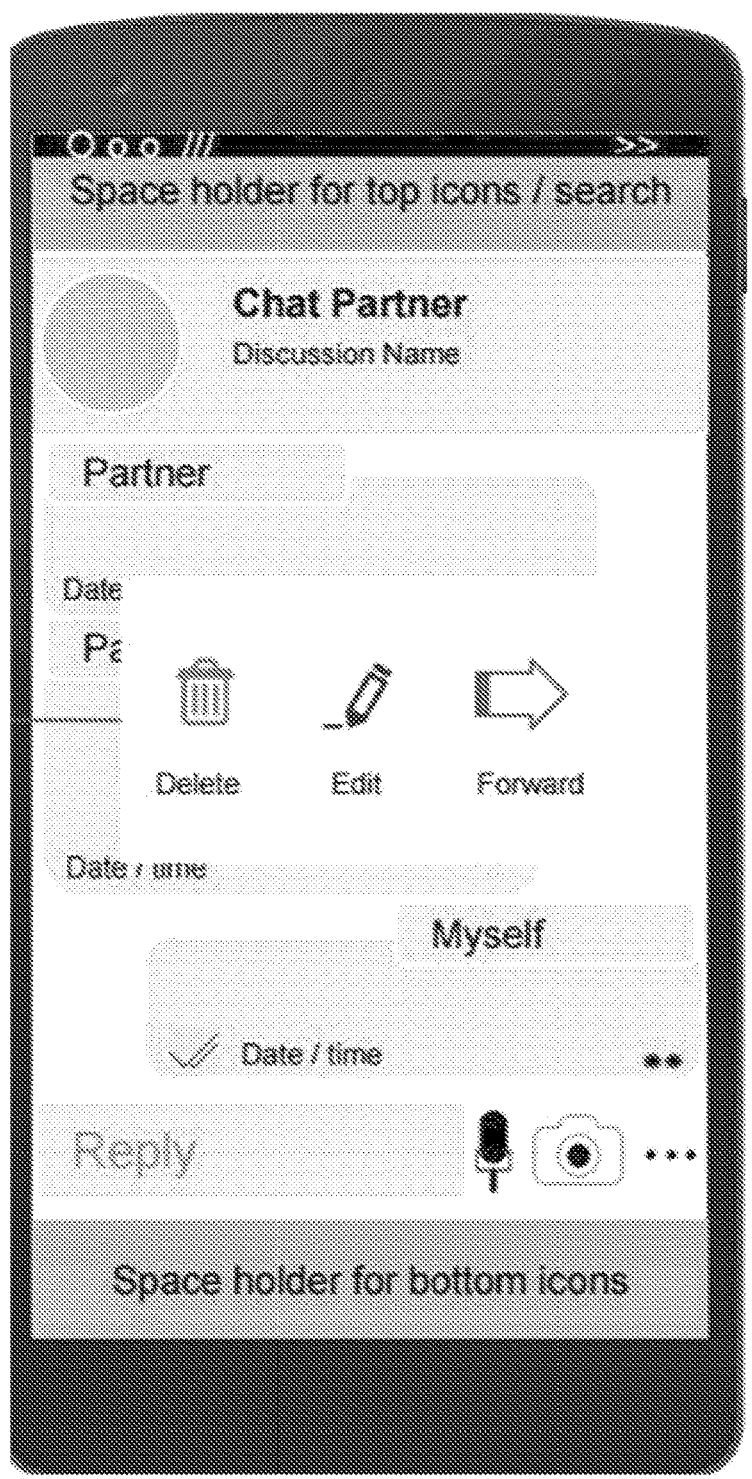
Figure 14:
FIG. 14 illustrates an example screenshot of inside an active Group Chat of a Family networking messaging service.
Figure 15:
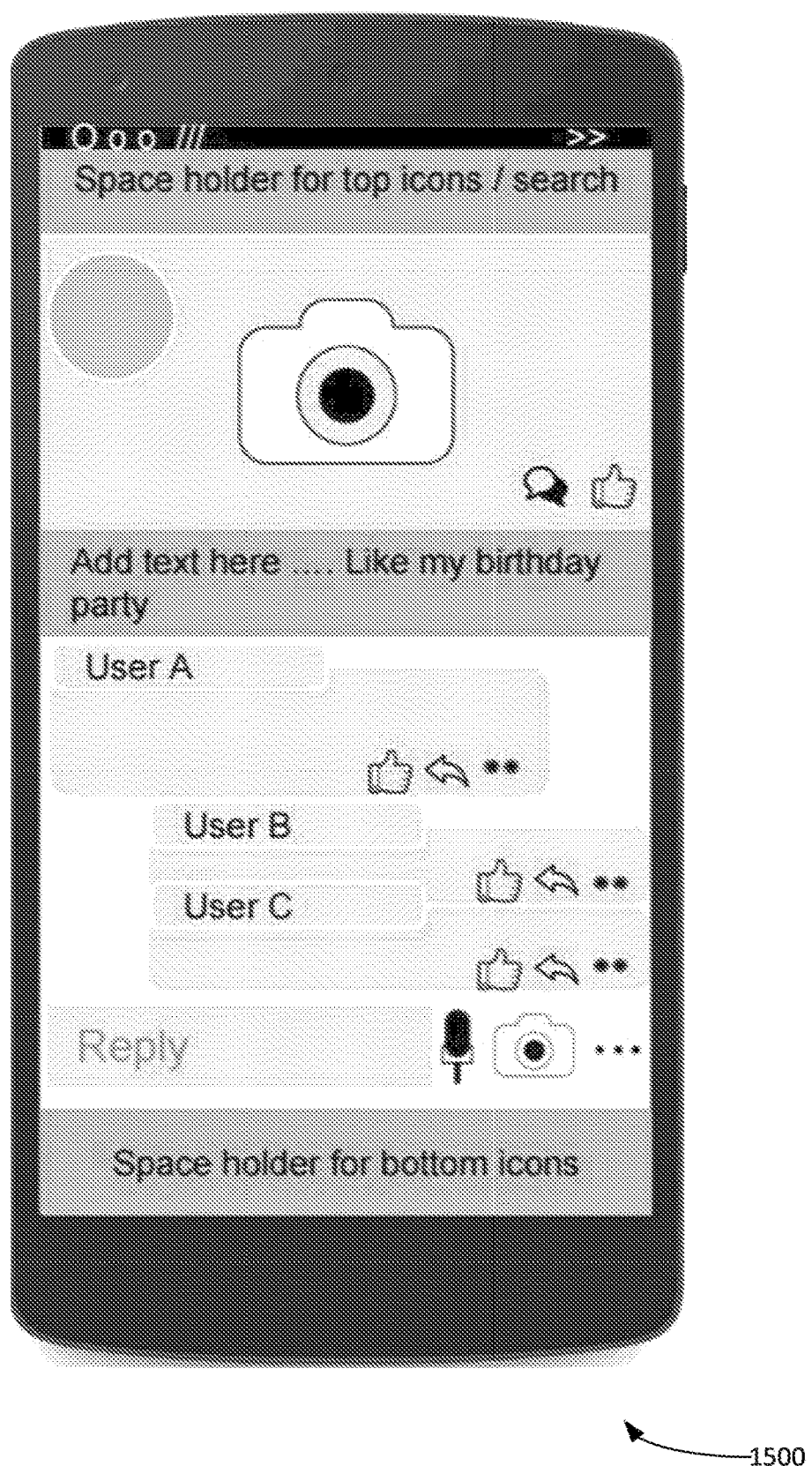
FIG. 15 illustrates an example screenshot inside an active post session of a Family networking messaging service.

FIGS. 10-20 illustrate example screen shots 1000-2000 of messages implemented with a Family networking messaging service, according to some embodiments. More specifically, FIG. 10 illustrates an example screenshot 1000 of a chat/post landing page of a Family networking messaging service. FIGS. 11 A-C illustrate an example screenshot 1100 for initiating chats/posting in a Family networking messaging service. FIG. 12 illustrates an example screenshot 1200 of group chat/post pages of a Family networking messaging service. FIGS. 13 A-B illustrate an example screenshot 1300 inside an active chat session of a Family networking messaging service. FIG. 14 illustrates an example screenshot 1400 of inside an active Group Chat of a Family networking messaging service. FIG. 15 illustrates an example screenshot

Figure 16:
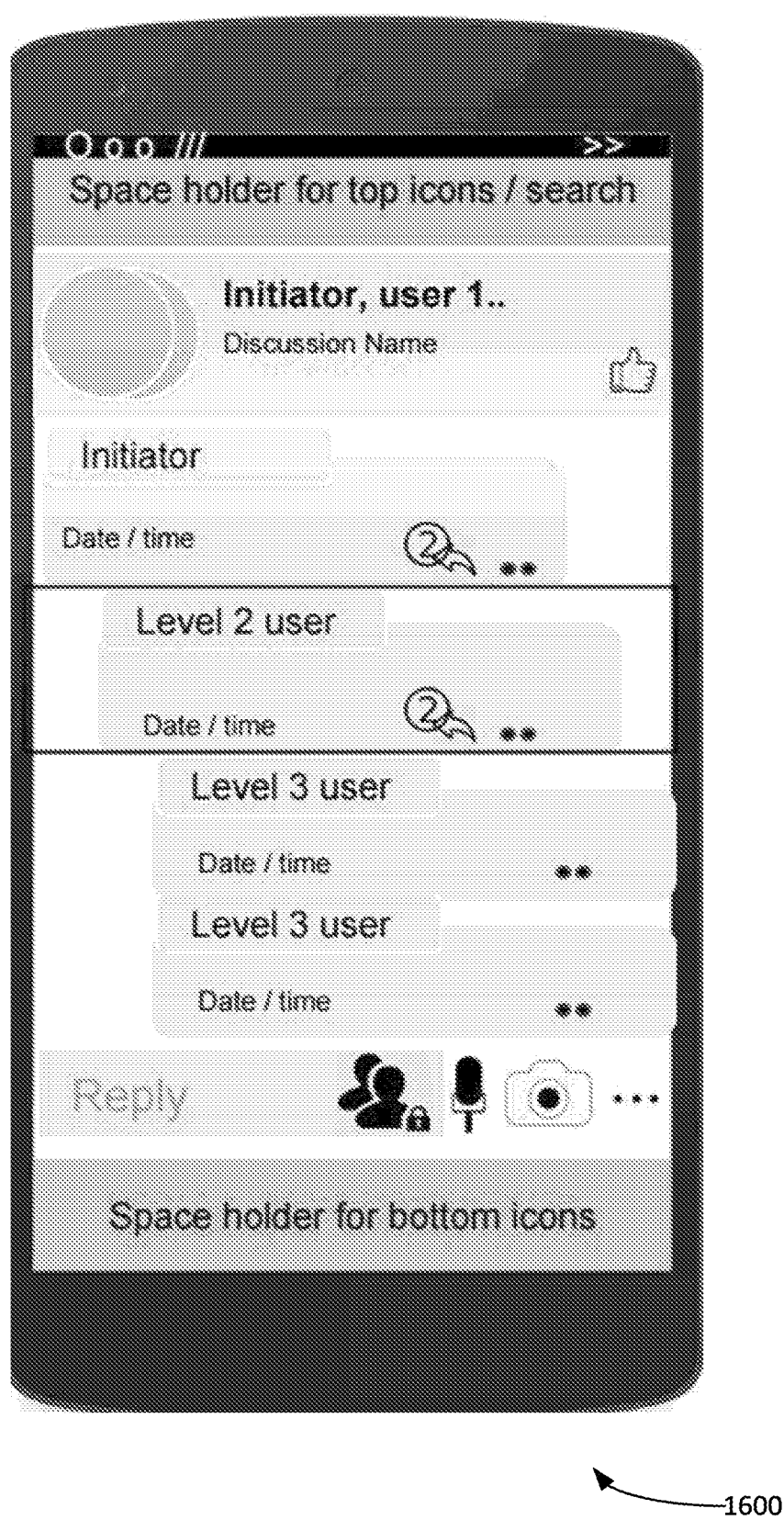
FIG. 16 illustrates an example screenshot of a private reply of a Family networking messaging service.
Figure 17A:
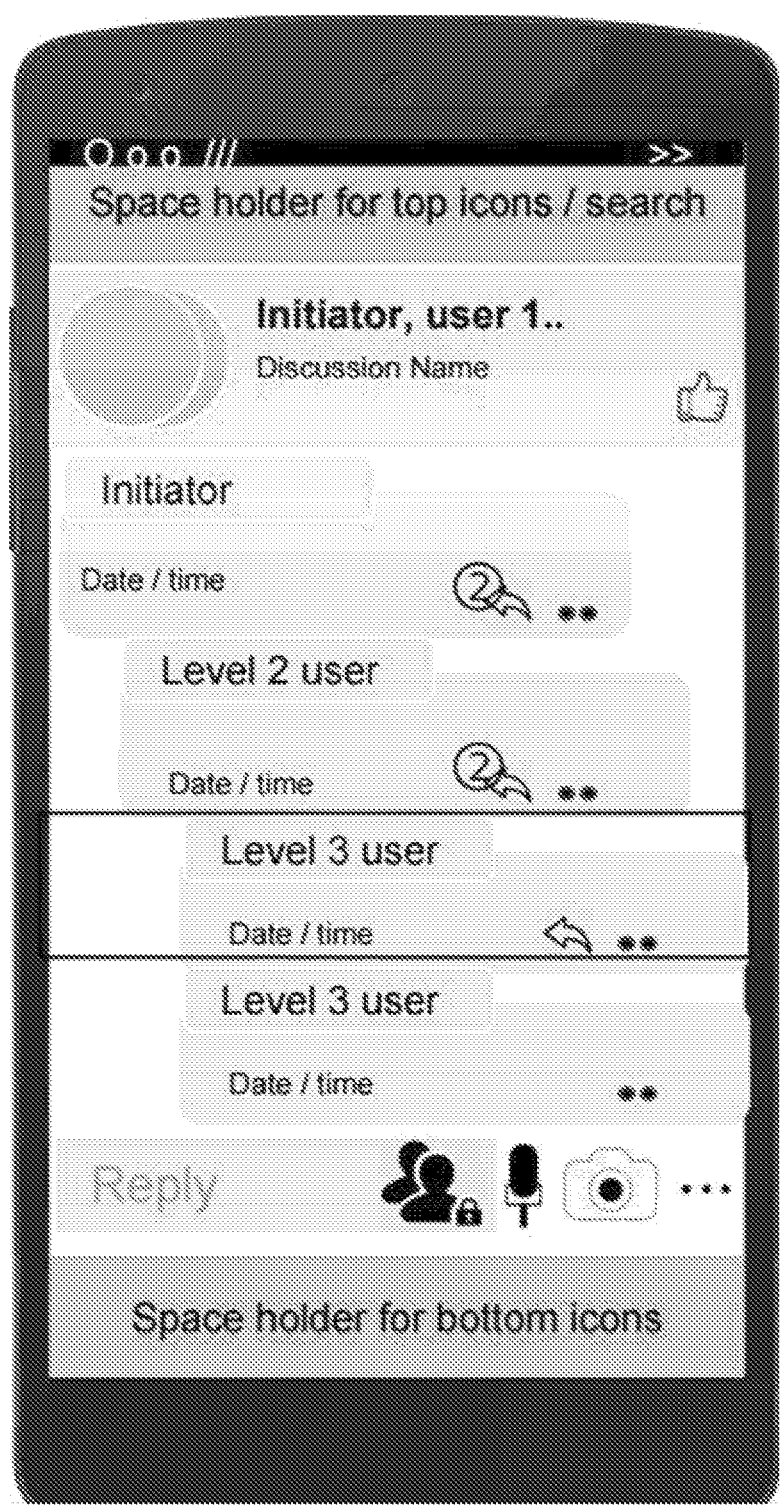
FIGS. 17 A-B illustrate an example screenshot for creating a one-to-one chat out of a group discussion of a Family networking messaging service.
Figure 17B:
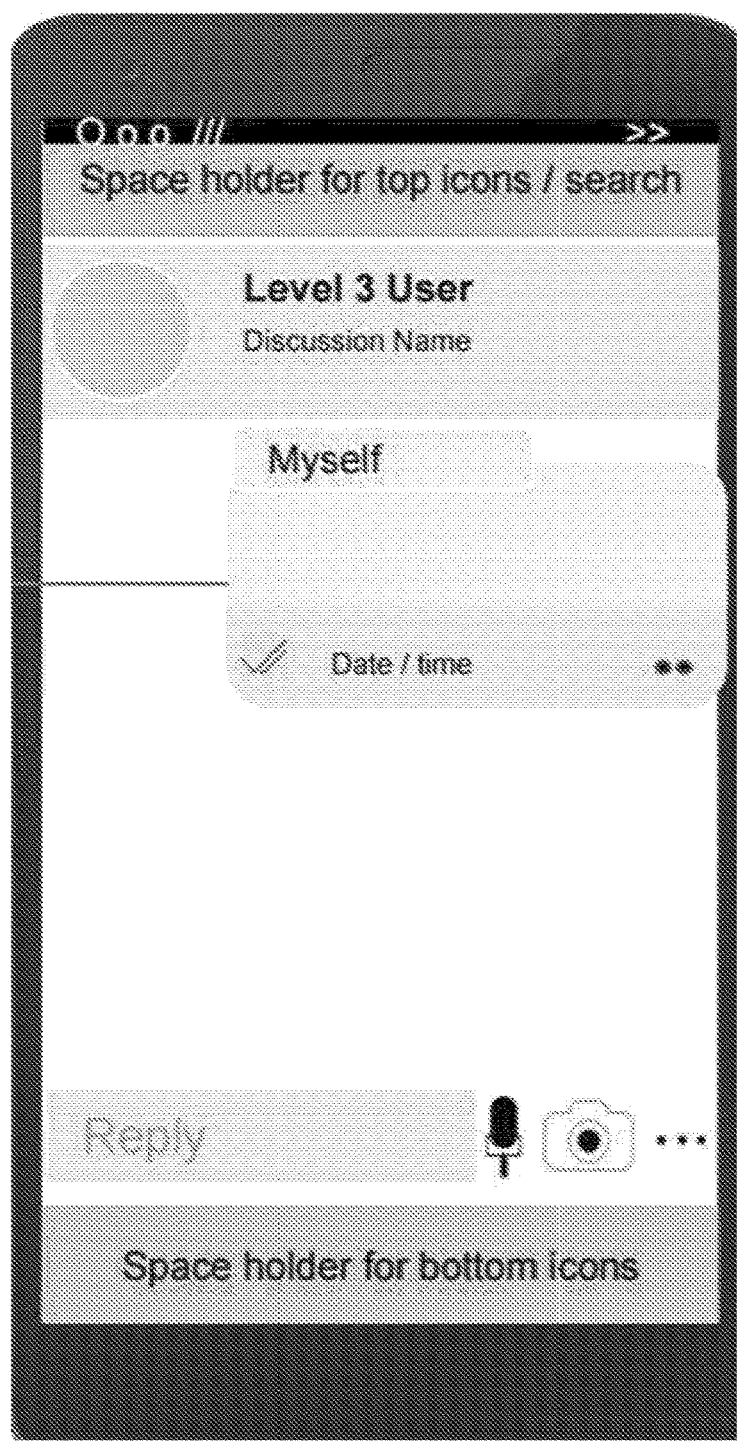
Figure 18:
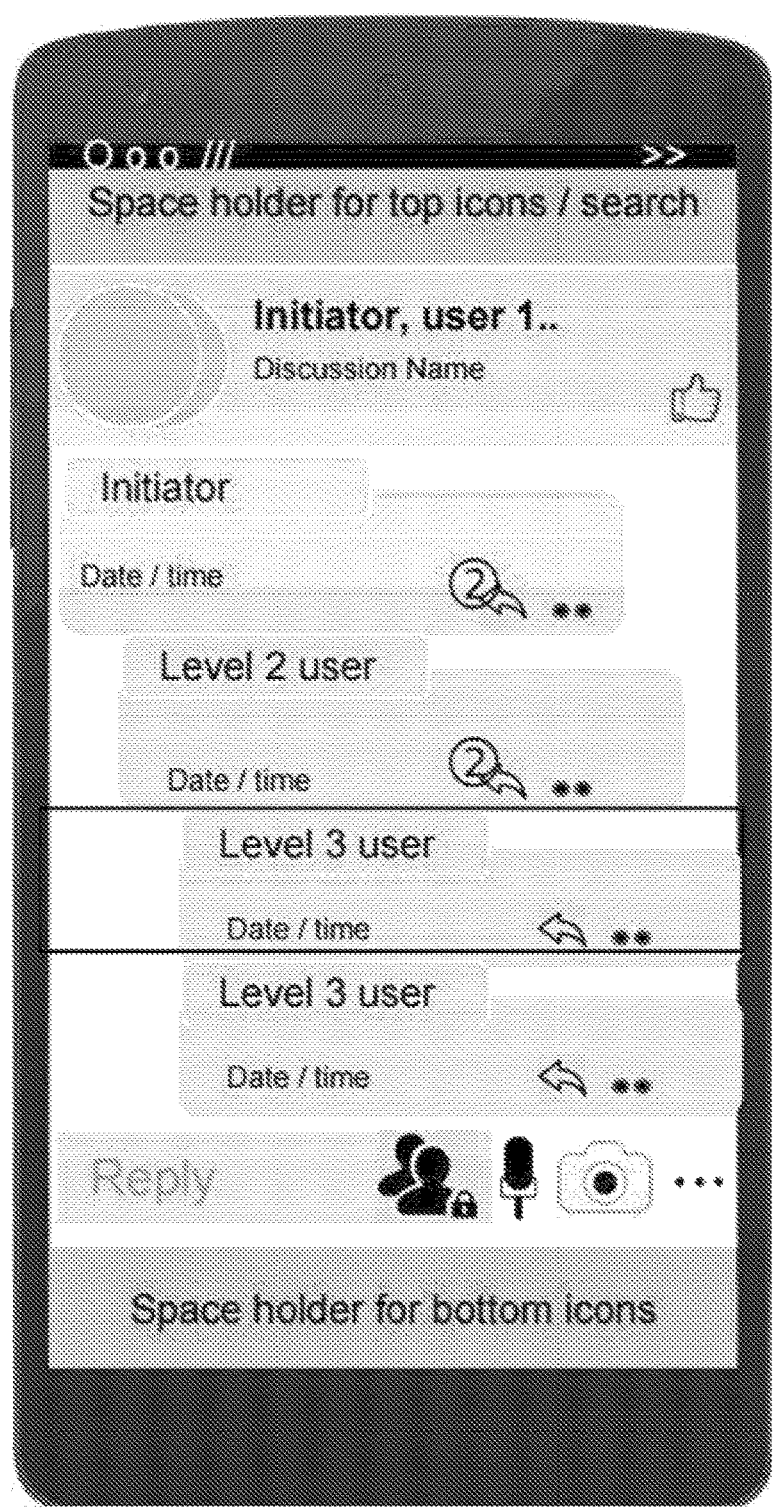
FIG. 18 illustrates an example screenshot for creating a pop-out one-to-one chat out of a group discussion in a Family networking messaging service.
Figure 19:
FIG. 19 illustrates an example screenshot of another group chat in a Family networking messaging service.
Figure 20:
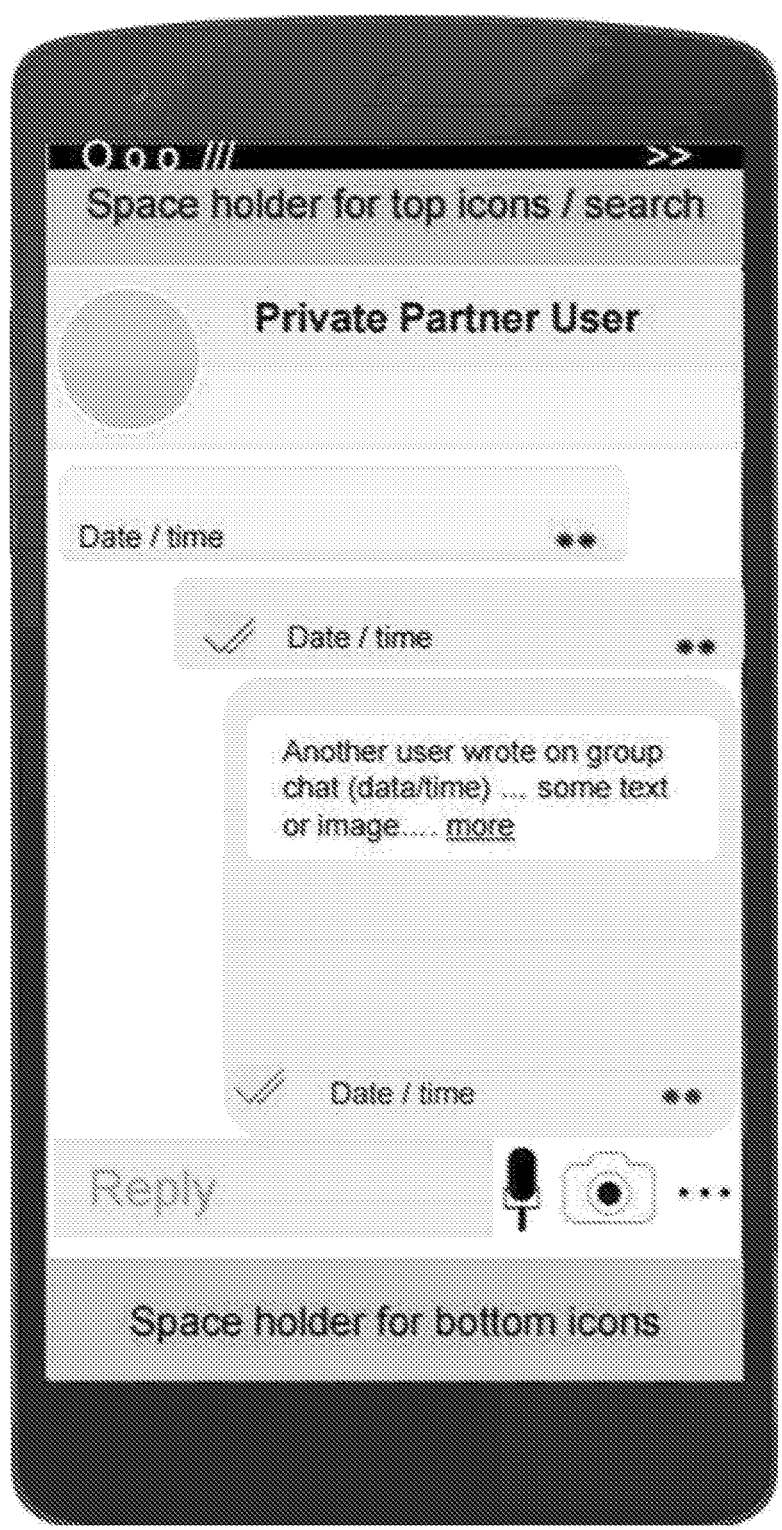
FIG. 20 illustrates an example screenshot of a reply in a group chat in a Family networking messaging service.

1500 inside an active post session of a Family networking messaging service. FIG. 16 illustrates an example screenshot 1600 of a private reply of a Family networking messaging service. FIGS. 17 A-B illustrate an example screenshot 1700 for creating a one-to-one chat out of a group discussion of a Family networking messaging service. FIG. 18 illustrates an example screenshot 1800 for creating a pop-out one-to-one chat out of a group discussion in a Family networking messaging service. FIG. 19 illustrates an example screenshot 1900 of another group chat in a Family networking messaging service. FIG. 20 illustrates an example screenshot 2000 of a reply in a group chat in a Family networking messaging service.

Additional Functionalities

Figure 21:
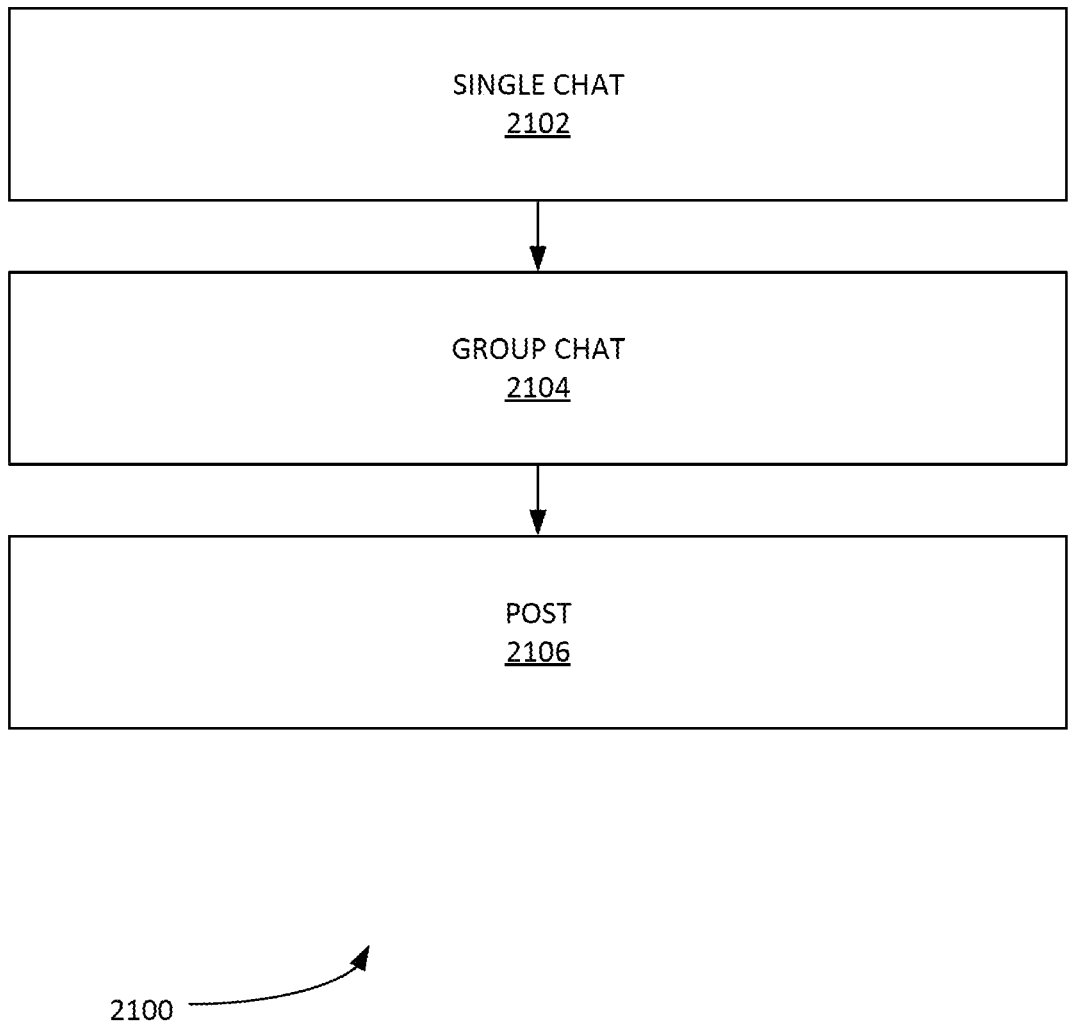
FIG. 21 illustrates an example process for implementing a specified chat/post functionality in a family networking-computing platform, according to some embodiments.

FIG. 21 illustrates an example process 2100 for implementing a specified chat/post functionality in a family networking-computing platform, according to some embodiments. Family networking-computing platform can be family networking-computing platform 108. The feature can be implemented in a family networking-computing platform 108. The chat/post functionality can be categorized in three sub categories (e.g. single chat, group chat and post in single chat) by process 2100.

More specifically, in step 2102, process 2100 can implement a single chat functionality. In step 2104, process 2100 can implement a group chat functionality. In step 2106, process 2100 can implement post functionalities.

In one example of process 2100, in a single chat functionality 2102, two users can communicate, using the chat/post functionality, between themselves by writing text messages or sharing pictures, location, etc. As noted supra, a disappearing message feature can be provided. With the disappearing message feature, the electronic message can disappear from the in-application chat box GUI element of both the users once the receiver of the disappearing message reads that message.

In a group chat functionality 2104, a group of users can communicate between them by writing text messages or sharing pictures, location, etc. Process 2100 can provide a private comment option. In the private comment option, any user can comment privately in the group chat. The private comment is viewable only to the initiator of the comment and to whom the comment has been made.

Process 2100 can use the post functionality 2106 to publish a post to a user's timeline. While creating the post, process 2100 can provide an option of whether the post is to be shared with the entire family networking-computing platform community; with the particular network of user; or with the family members only. Process 2100 can provide the option of making private comments in posts as well. In this option, if any user makes any private comment, that comment can be seen only by that user and the initiator of the post.

Figure 22:
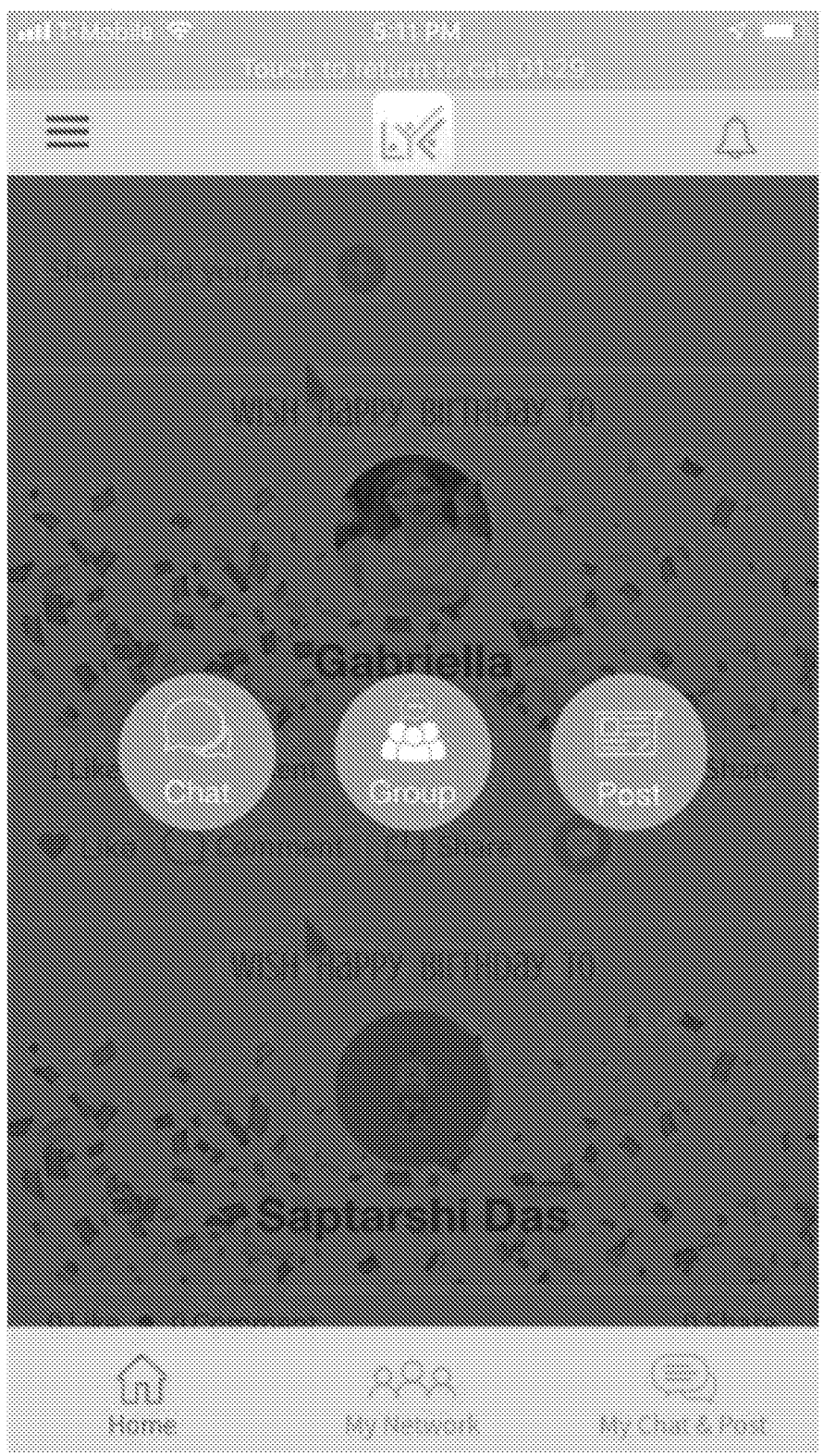
FIG. 22 illustrates an example screenshot for implementing chat/post functionality in a family networking-computing platform, according to some embodiments.

FIG. 22 illustrates an example screenshot 2200 for implementing chat/post functionality in a family networking-computing platform, according to some embodiments. More specifically, screenshot 2200 depicts the ease of selecting the nature of the feature 'Chat and Post' by tapping an icon beside the copy 'Share' icon.

Figure 23:
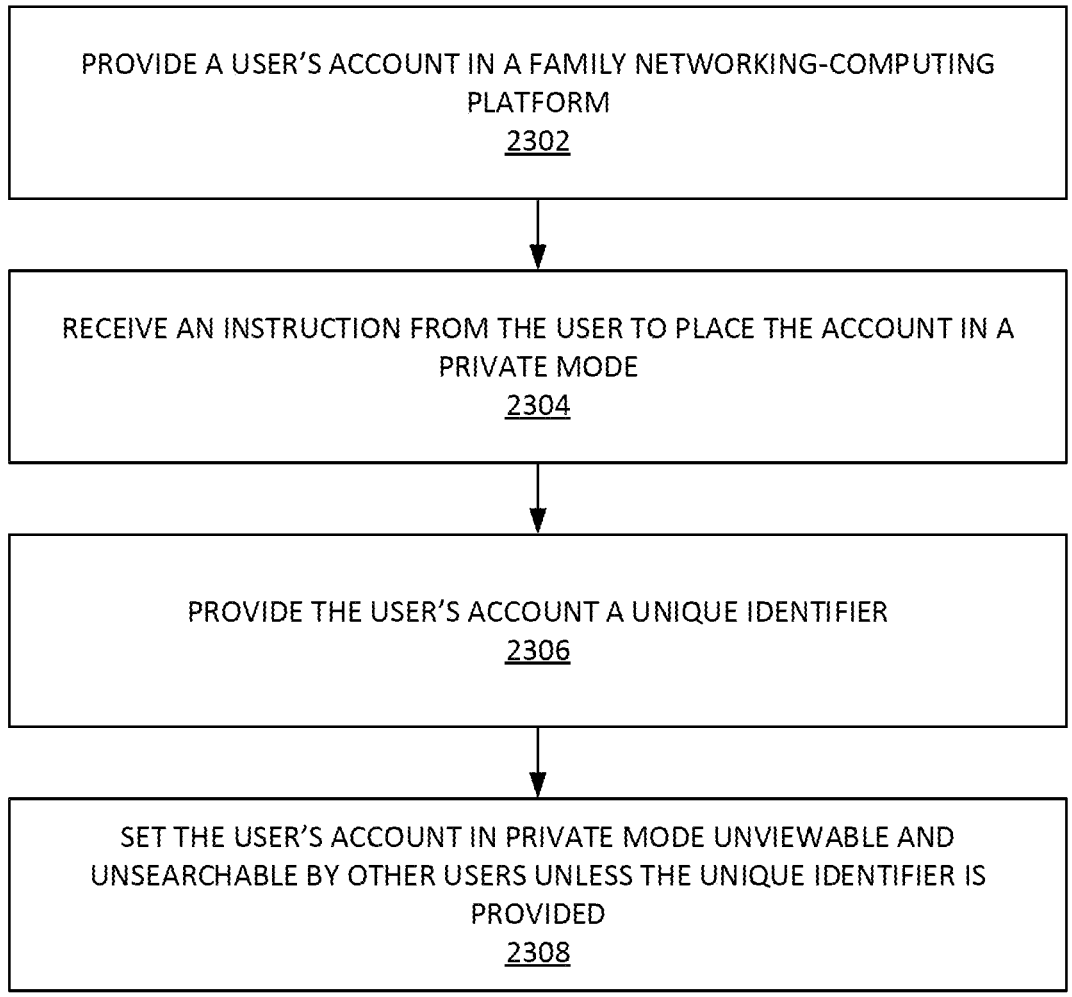
FIG. 23 illustrates an example process for providing an invisible user account in a family networking-computing platform, according to some embodiments.

FIG. 23 illustrates an example process 2300 for providing an invisible user account in a family networking-computing platform, according to some embodiments. Family networking-computing platform can be a family networking-computing platform 108. In step 2302, process 2300 can provide a user's account in a family networking-computing platform. In step 2304, process 2300 can receive an instruction from the user to place the account in a private mode. In step 2306, process 2300 provide the user's account a unique identifier. In step 2308, can set the user's account in private mode unviewable and unsearchable by other users unless the unique identifier is provided.

In one example, a user can use process 2300 to place an account in a private mode. Accordingly, the user's profile cannot be visible or searchable by any other user, unless the invisible user shares its unique identifier to any other user. In this way, the user's private mode profile can only be searched under that unique identifier. Process 2300 can also provide an option to connect with the user via sending a connection request tapping connect tab in the user's profile. When sending connection request, a family networking-computing platform engine can request the nature of the connection as either: 'close' or 'likeminded'. Once connected, an invisible user can remain connected as a 'close private' state or a 'likeminded' state. Accordingly, in the family networking-computing platform online social network, any user can keep itself as invisible and only visible to other users of the user's choice.

In one example, a user can be private in the family networking-computing platform online social network. Privacy can mean that the user is not visible or searchable by any other users of the family networking-computing platform online social network. The invisible user can share his/her unique identifier to other users, however. The user can be searched by other users using the unique identifier. In this way, other users can view the profile of the invisible user. The private user can have an option to connect with the user via sending a connection request. The connection request can be sent by tapping a 'connect tab' in the invisible user's profile. When sending connection request, a connection engine can request the nature of connection as either 'close' or 'likeminded'. Once connected, an invisible/private user can remain connected as a 'close private' or 'likeminded private' with the user's connections. In this way, a user can maintain himself/herself as invisible and only become visible to other users of his/her choice.

Figure 24:
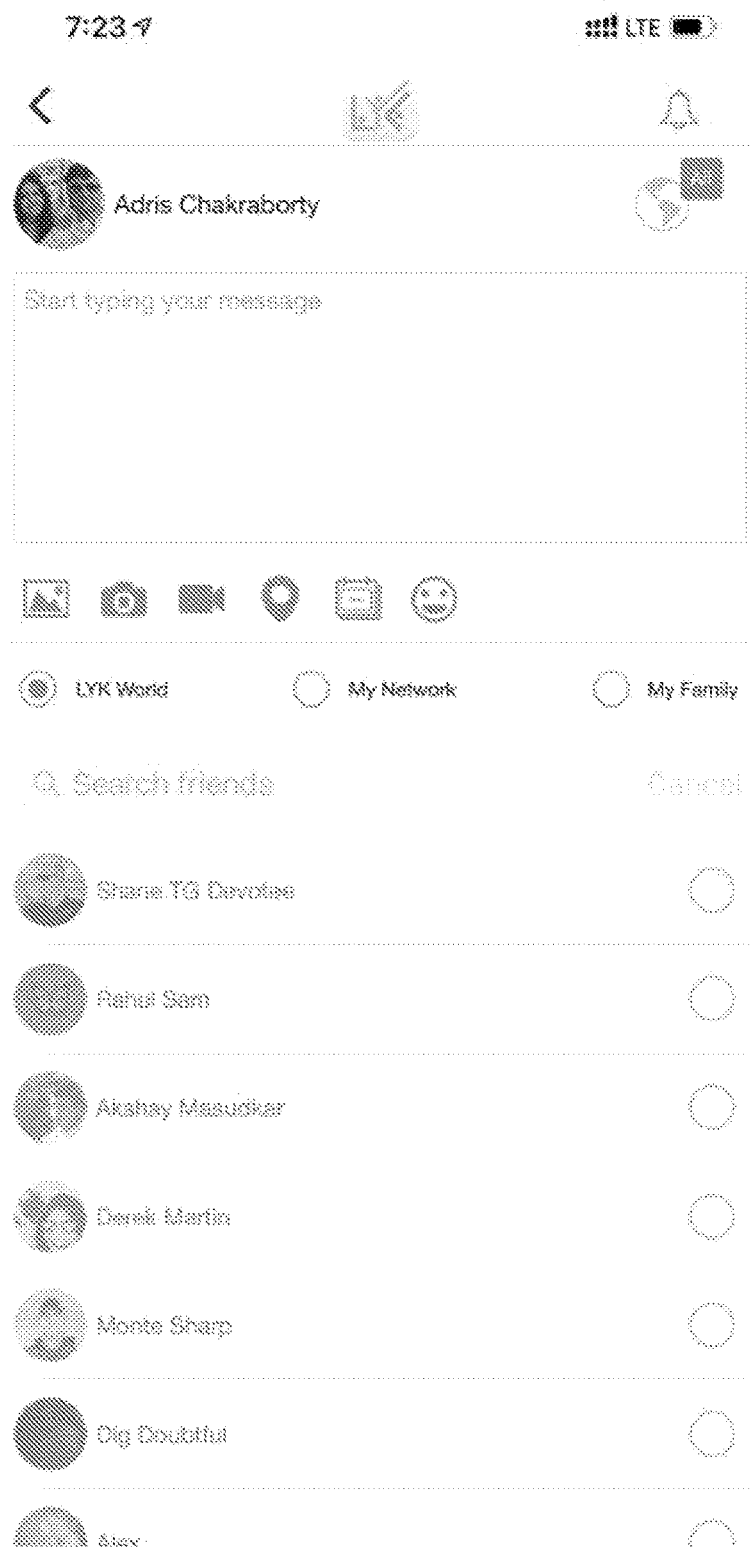
FIGS. 24 and 25 depict additional screen shots for implementing some embodiments.
Figure 25:
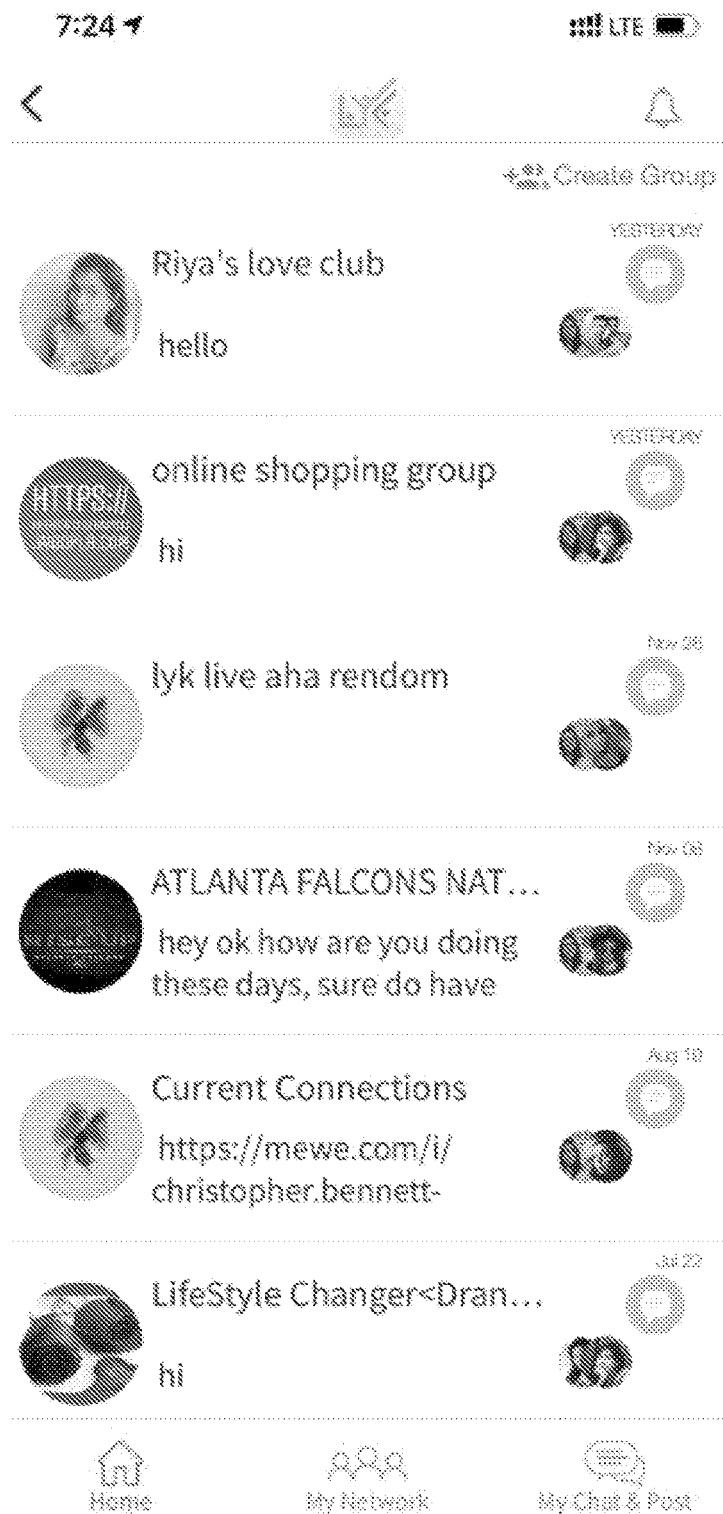

FIGS. 24 and 25 depict additional screen shots for implementing some embodiments. It is noted that networking among likeminded connections and the same family networking methodology can be used for likeminded connections.

Figure 26:
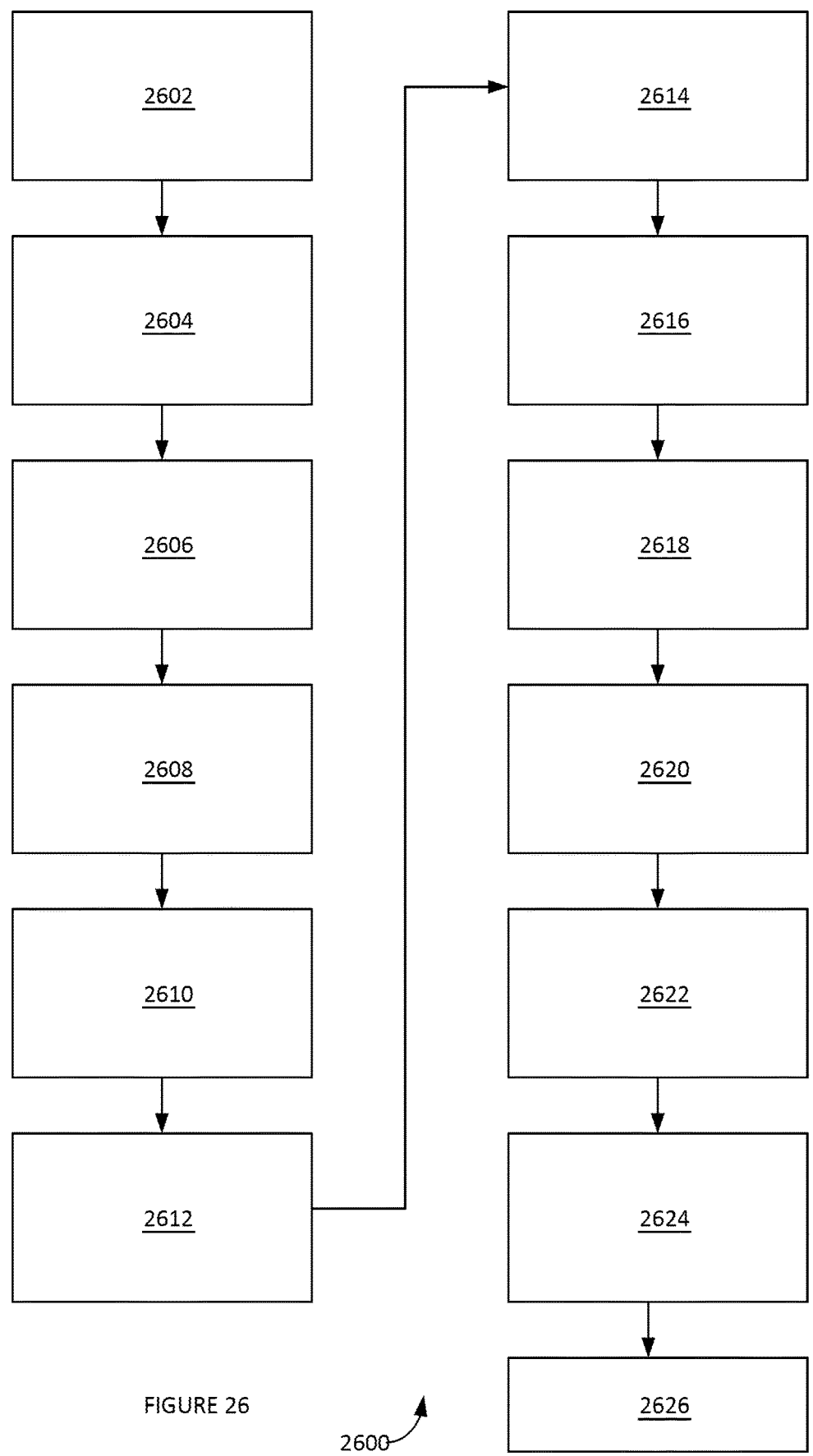
FIG. 26 illustrates an example process for implementing managing private profiles, according to some embodiments.
Figure 27:
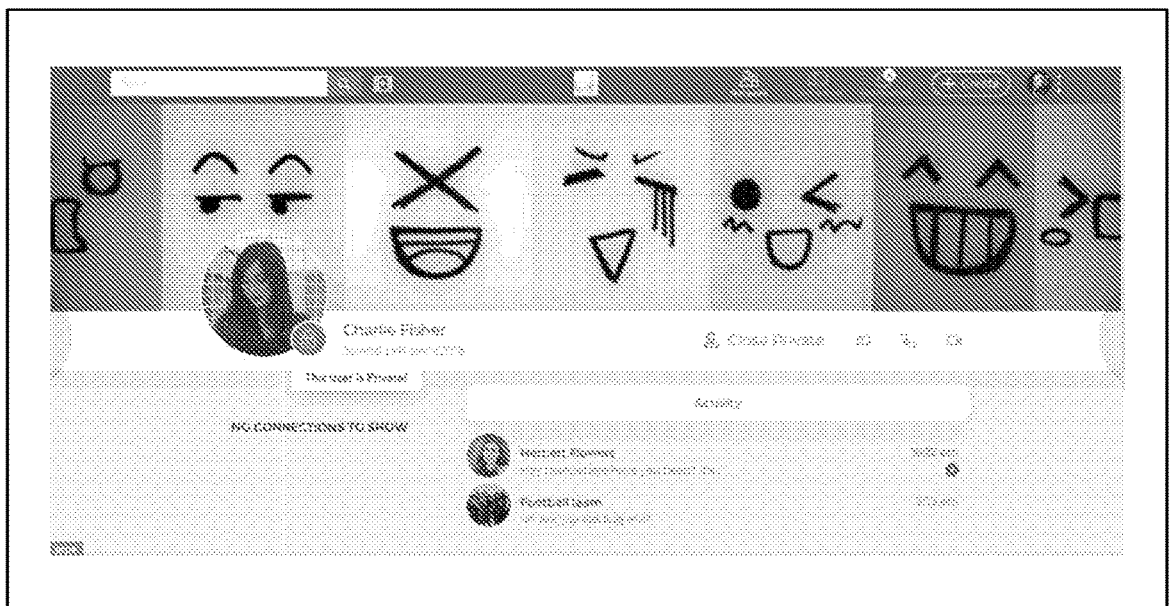
Figure 28:
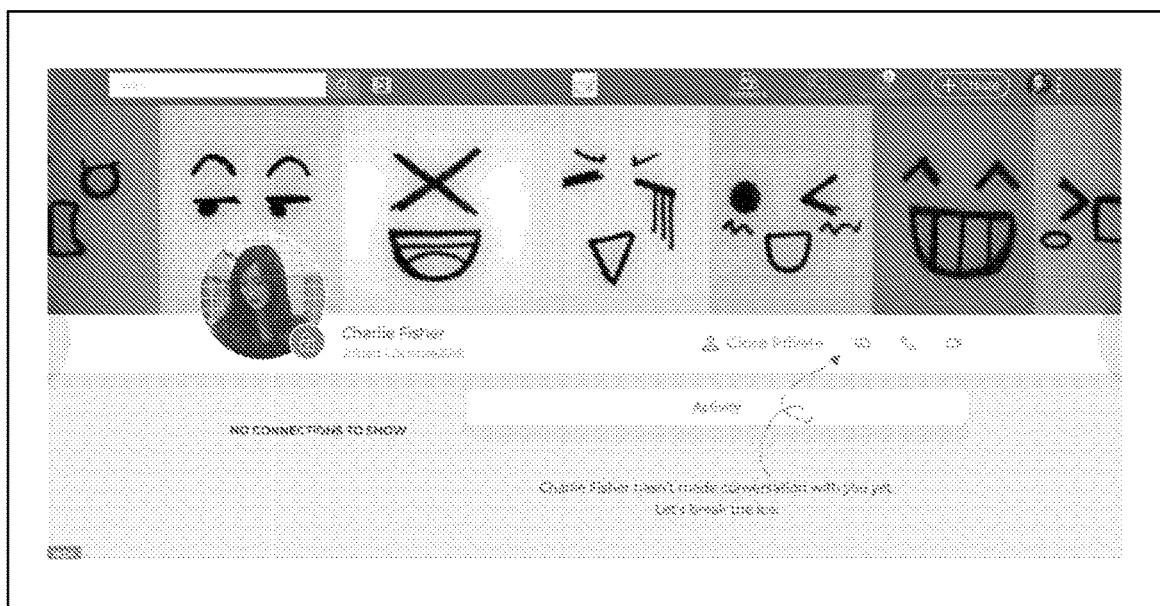
Figure 33:
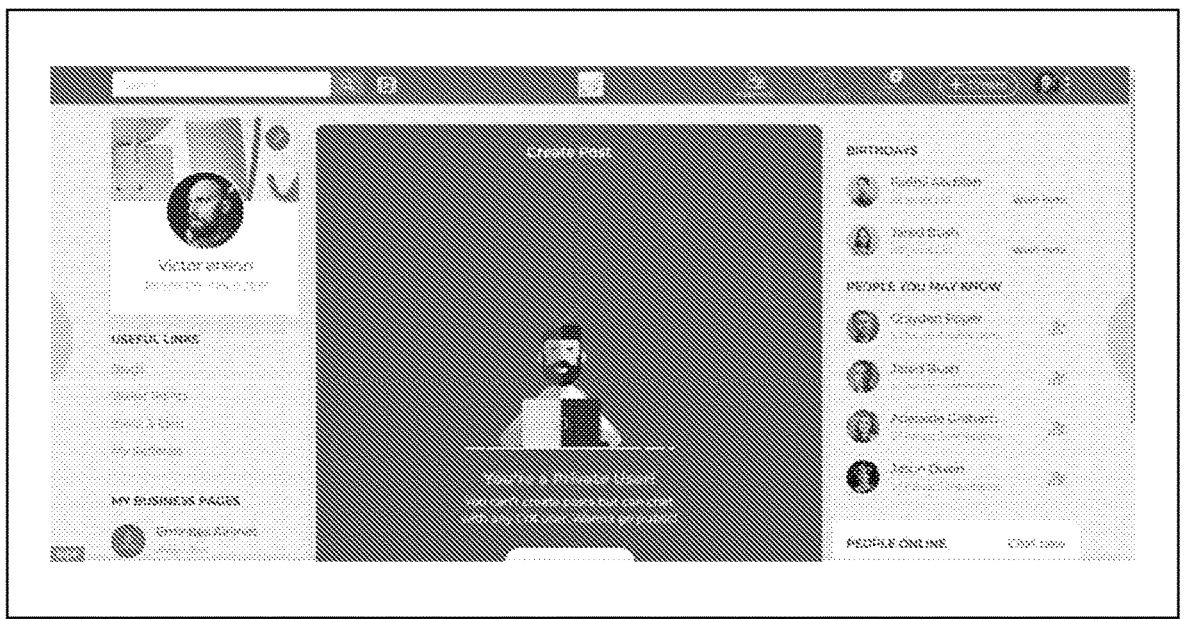
Figure 34:
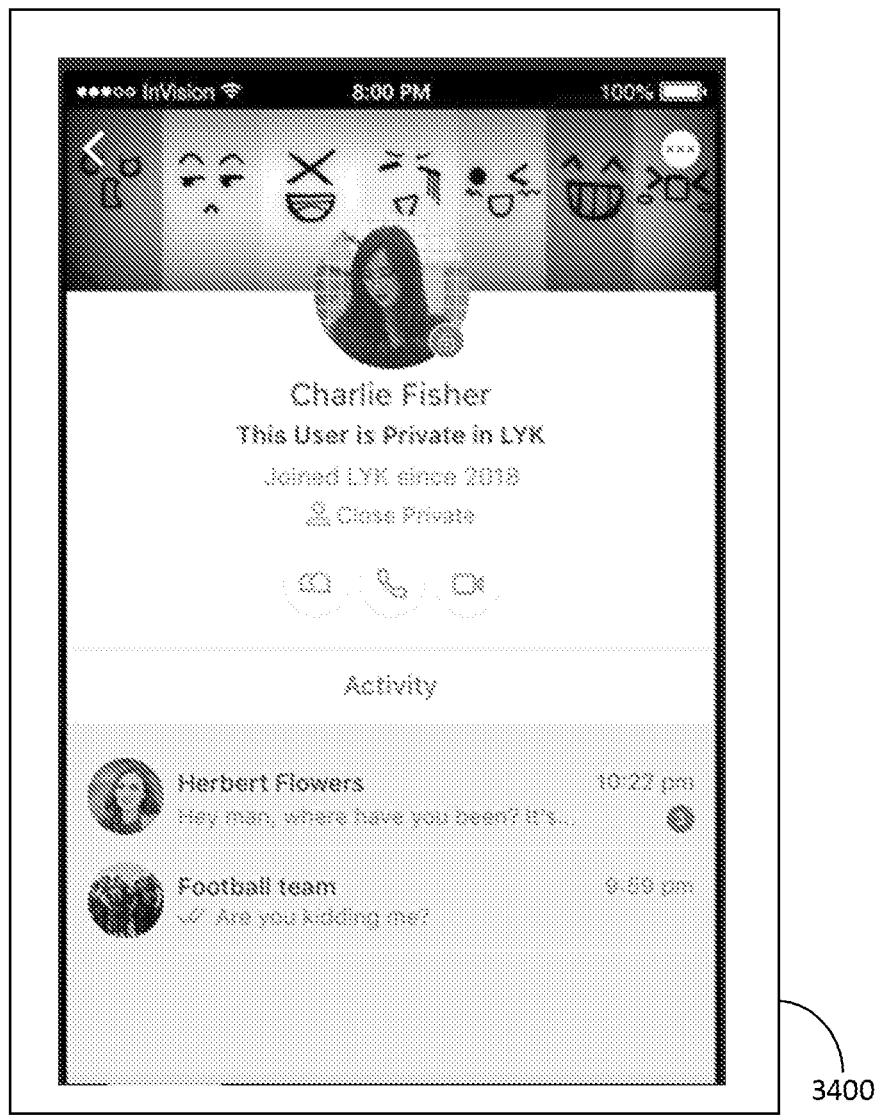
Figure 35:
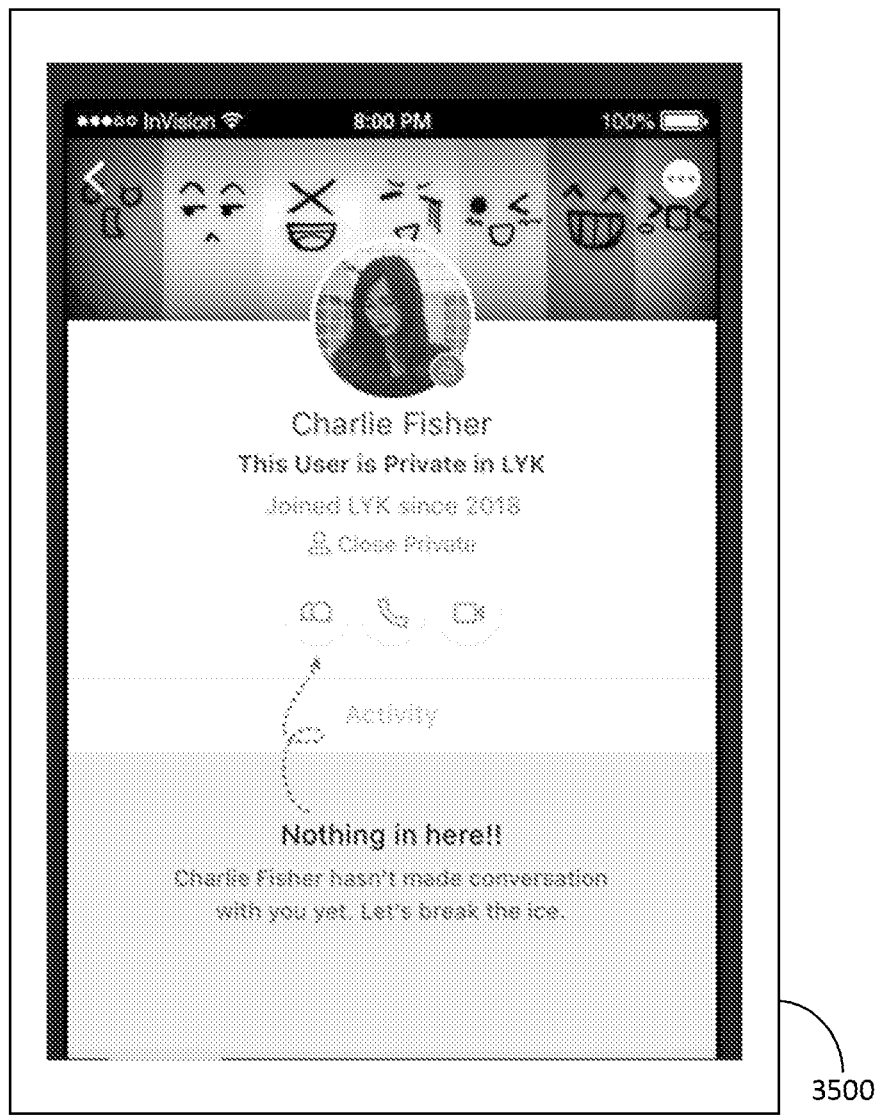
Figure 36:
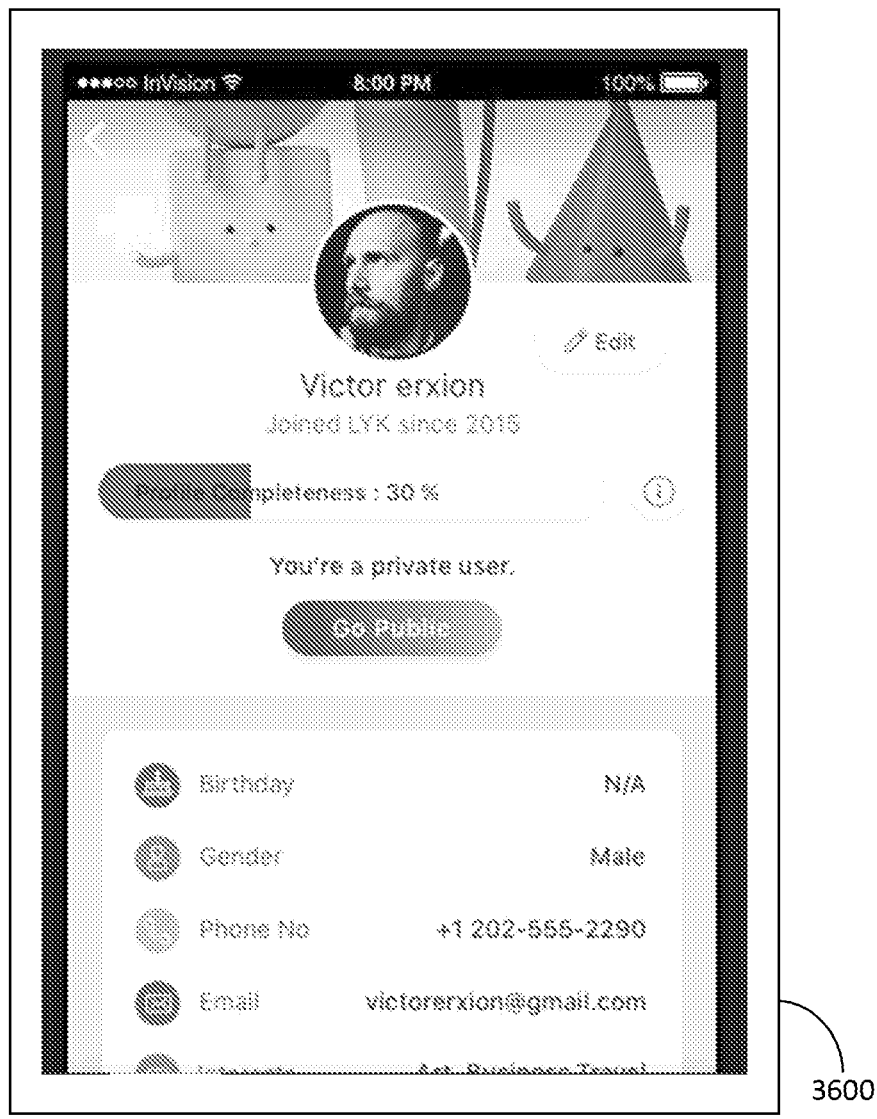
Figure 37:
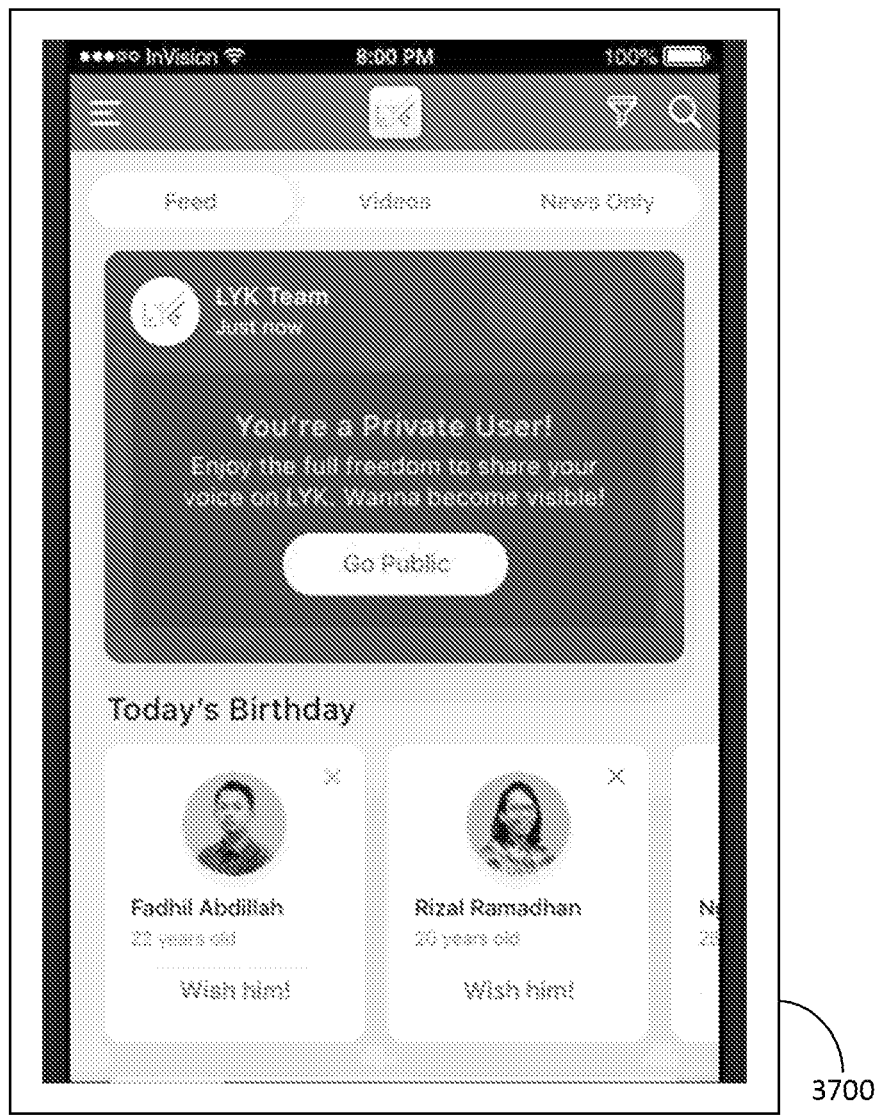
Figure 38:
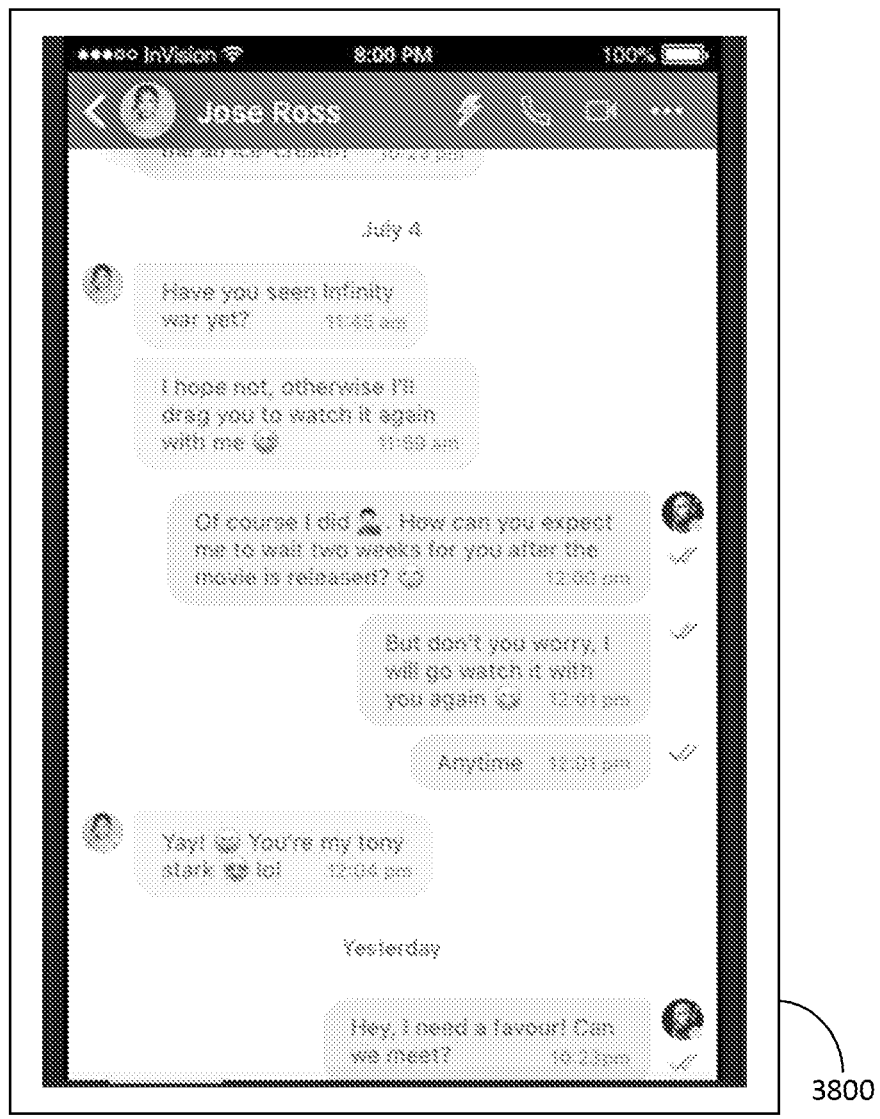
Figure 39:
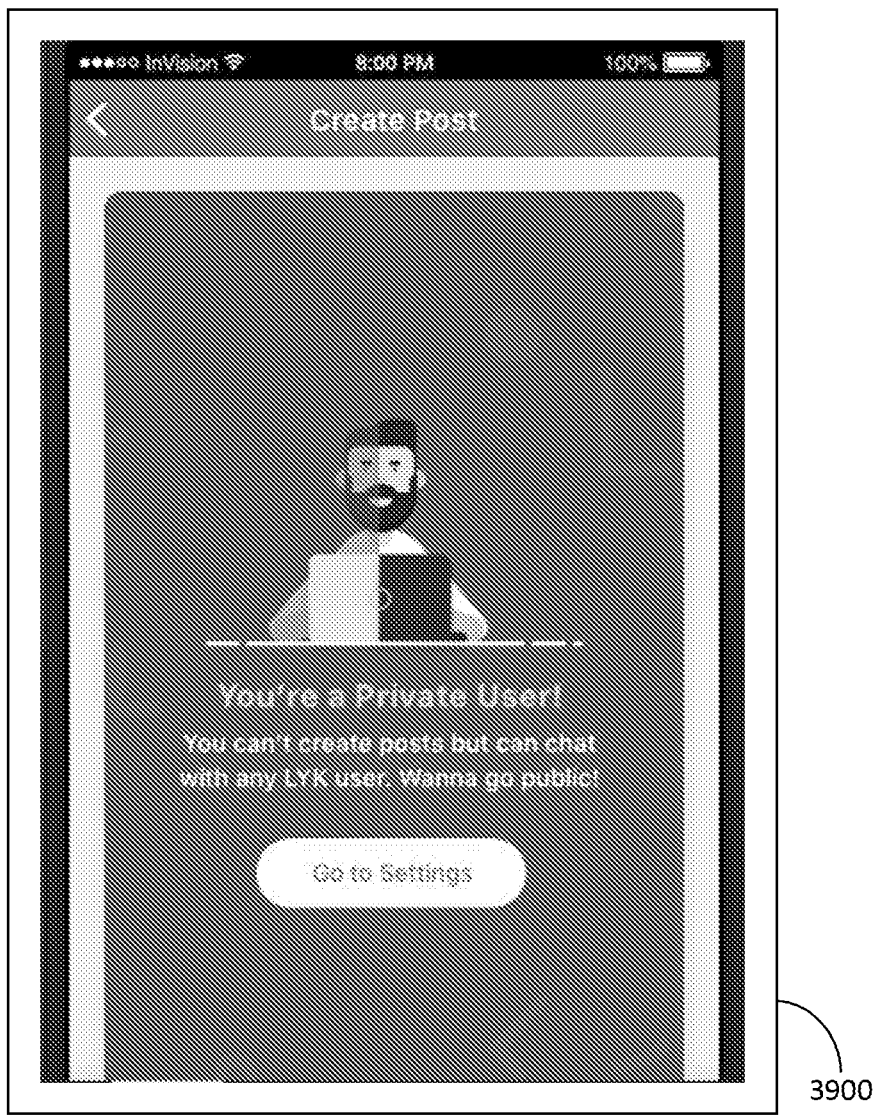

FIG. 26 illustrates an example process 2600 for implementing managing private profiles, according to some embodiments. Process 2600 can provide for a private profile where the user cannot be discovered in a social networking-computing platform. Other users cannot search the user with the private profile by the user's name. Other users can only search via a unique networking-computing platform identifier. The unique networking-computing platform identifier can be an alpha-numeric code that is unique to each user of the networking-computing platform.

More specifically, in step 2602, in the settings of the online social networking-computing platform, the user can be provided an option to change to a private user from a public user. The online social networking-computing platform then changes the status from public to private.

In step 2604, the private users can only be searched and discovered with the unique networking-computing platform identifier. In step 2606, the user can change the unique networking-computing platform identifier if the previous one has been compromised. Once the user changes the unique networking-computing platform identifier, the previous one ceases to work (e.g. the old unique networking-computing platform identifier won't show the user, etc.).

The unique networking-computing platform identifier can only be for private users and no one else.

In step 2608, private users can only chat with their connections and be a part of their group chats only with their connections. In step 2610, a rule is implemented such that no other users can add a private user to any group chat. In step 2612, the private users can create a group chat using their list of connections. In step 2614, a post published by a private user can only be shown in their connections timeline. No other users else can see their post. In step 2616, a world option is shown when a private user wants to make a post. For example, only a specified subset of the private user's social network members (e.g. "my network", etc.) is shown. In step 218, a private user cannot make any comment to any post but can only like a post (e.g. as private post like mode, etc.).

In step 2620, when a private user likes a post, everyone can see the like, and they can see that it been made from an anonymous private user. In another option, only the like may be visible.

In step 2622, the online social networking-computing platform can provide a share option for a private user is limited to only its network. IN step 2624, any user who is not connected to a private user and wanted to check a private user's profile would see a specified message (e.g. "this user is Private", etc.). Users who are connected with a private user can see only those activities which private user has indicated as visible for the online social networking-computing platform to show. They can only view the mutual interests and no connections of private user. They can see any group chat or private activities which involve that particular user. In step 2626, the private username is provided as anonymous.

FIGS. 27-39 illustrate example screenshots that can be used to implement managing private profiles, according to some embodiments.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

The online social network can provide a digital wallet for users. The digital wallet can use digital wallet points. The digital wallet can be used to reward user for doing different activities on the online social network while spending their time on our social platform. It is noted that social platforms often obtain revenue from the data points their users share while staying engaged on the platform. Users data points can be monetized in several ways so as to maximize their revenues but users may not be rewarded for the same. The present online social network includes a mechanism whereby users are rewarded whenever they share meaningful data points which online social network can monetize to grow its revenue. A portion of the revenue is apportioned towards rewarding the users on online social network and that's in form of online social network wallet points. The online social network wallet point is the currency within the online social network echo system and users keep accumulating these wallet points while they share meaningful data points while spending their time on online social network and complying to its terms of conditions set for accruing the wallet points.

Example Machine Learning Implementations

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

Machine learning can be used to study and construct algorithms that can learn from and make predictions on data. These algorithms can work by making data-driven predictions or decisions, through building a mathematical model from input data. The data used to build the final model usually comes from multiple datasets. In particular, three data sets are commonly used in different stages of the creation of the model. The model is initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). In practice, the training dataset often consist of pairs of an input vector (or scalar) and the corresponding output vector (or scalar), which is commonly denoted as the target (or label). The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. This procedure is complicated in practice by the fact that the validation dataset's error may fluctuate during training, producing multiple local minima. This complication has led to the creation of many ad-hoc rules for deciding when overfitting has truly begun. Finally, the test dataset is a dataset used to provide an unbiased evaluation of a final model fit on the training dataset. If the data in the test dataset has never been used in training (for example in cross-validation), the test dataset is also called a holdout dataset.

It is noted that databases described herein can be automatically sampled by the statistical algorithm. There are several methods which may be used to select a proper sample size and/or use a given sample to make statements (within a range of accuracy determined by the sample size) about a specified population. These methods may include, for example:

1. Classical Statistics as, for example, in "Probability and Statistics for Engineers and Scientists" by R. E. Walpole and R. H. Myers, Prentice-Hall 1993; Chapter 8 and Chapter 9, where estimates of the mean and variance of the population are derived.

2. Bayesian Analysis as, for example, in "Bayesian Data Analysis" by A Gelman, 1. B. Carlin, H. S. Stern and D. B. Rubin, Chapman and Hall 1995; Chapter 7, where several sampling designs are discussed.

3. Artificial Intelligence techniques, or other such techniques as Expert Systems or Neural Networks as, for example, in "Expert Systems: Principles and Programming" by Giarratano and G. Riley, PWS Publishing 1994; Chapter 4, or "Practical Neural Networks Recipes in C++" by T. Masters, Academic Press 1993; Chapters 15, 16, 19 and 20, where population models are developed from acquired data samples.

4. Latent Dirichlet Allocation, Journal of Machine Learning Research 3 (2003) 993-1022, by David M. Blei, Computer Science Division, University of California, Berkeley, Calif. 94720, USA, Andrew Y. Ng, Computer Science Department, Stanford University, Stanford, Calif. 94305, USA It is noted that these statistical and probabilistic methodologies are for exemplary purposes and other statistical methodologies can be utilized and/or combined in various embodiments. These statistical methodologies can be utilized in whole or in part as well.

It is noted online social networks can be analyzed using Social network analysis (SNA). SNA is the process of investigating social structures through the use of network and graph theories. It characterizes networked structures in terms of nodes (individual actors, people, or things within the network) and the ties, edges, or links (relationships or interactions) that connect them. Examples of social structures commonly visualized through social network analysis include social media networks, friendship and acquaintance networks, collaboration graphs, kinship, etc. These networks are often visualized through sociograms in which nodes are represented as points and ties are represented as lines.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method of a managing an online social network comprising:
   providing an online social network, wherein the online social network comprises aset of nodes, wherein each node represents a user and a set of relationships between each node;
   managing a private profile setting in the online social network by:
      in the settings of the user's dashboard of the online social networking-computing, providing the user an option to change to a private user from a public user;

detecting that the user has selected to be a private user; and assigning a unique networking-computing platform identifier to the private user, wherein the unique networking-computing platform identifier is required to search for the private user in the online social network, wherein the private user cannot make any comment to another user's post, and wherein the private user is enabled to like the user's post; and wherein when the private user likes a post, all other members can see the like, and that the like was made by an anonymous private user without showing an identity of the private user.

2. The computerized method of claim 1, wherein the online social network provide a share option for the private user that is limited to only a network of connections to the private user.

3. The computerized method of claim 2, wherein a second user who is not connected to the private user receives a specified message stating that the private user's profile is in a private state.

4. The computerized method of claim 2, wherein the private user changes the unique networking-computing platform identifier when the unique networking-computing platform identifier has been compromised.

5. The computerized method of claim 4, wherein once the private user changes the unique networking-computing platform identifier to a new unique networking-computing platform identifier, the previous unique networking-computing platform identifier ceases to work.

6. The computerized method of claim 5, wherein the private user can only chat with the network of connections of the private user.

7. The computerized method of claim 6, wherein the private user can join a group chat only with the network of connections of the private user.

8. The computerized method of claim 6, wherein a rule is implemented such that no other users can add the private user to any group chat.

9. The computerized method of claim 8, wherein the private user creates a group chat using the network of connections of the private user.

10. The computerized method of claim 9, wherein a post published by the private user is only be shown in the network of connections of the private user.

11. The computerized method of claim 10, wherein the online social network provides an online social-networking messenger service.

12. The computerized method of claim 11, wherein the online social-networking messenger service enables a set of members of the online social network to interact via a chat protocol.

13. The computerized method of claim 12, wherein the chat protocol comprises a set of private chat messages between the private user and another member that are not visible to any other user of the online social-networking messenger service.

14. The computerized method of claim 13, wherein a world option is shown when the private user makes the post.

15. The computerized method of claim 14, wherein the online social network aggregates a set of data about each user of the online social network.

16. The computerized method of claim 15, wherein the online social network enables a third party to purchase access to the set of data about each user of the online social network for a specified monetary price.

17. The computerized method of claim 15, wherein the online social network provides a portion of a specified monetary price to each user of the online social network with data in the set of data about each user of the online social network.

* * * * *